US007738082B1

(12) United States Patent  
Peters

(10) Patent No.: US 7,738,082 B1  
(45) Date of Patent: Jun. 15, 2010

(54) SYSTEM AND METHOD FOR MEASURING A SIZE OF A DISTANT OBJECT

(75) Inventor: Victoria J. Peters, Vernonia, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 0 days.

(21) Appl. No.: 11/876,559

(22) Filed: Oct. 22, 2007

Related U.S. Application Data

(60) Provisional application No. 60/862,389, filed on Oct. 20, 2006.

(51) Int. Cl.
G01C 3/08 (2006.01)
(52) U.S. Cl. .................................... 356/4.01
(58) Field of Classification Search .......... 356/3.01–22
See application file for complete search history.

(56) References Cited

U.S. PATENT DOCUMENTS

| 3,190,003 | A | 6/1965 | O'Brien |
| 3,392,450 | A | 7/1968 | Herter et al. |
| 3,431,652 | A | 3/1969 | Leatherwood |
| 3,492,733 | A | 2/1970 | Leatherwood |
| 3,684,376 | A | 8/1972 | Lessard |
| 3,948,587 | A | 4/1976 | Rubbert |
| 4,403,421 | A | 9/1983 | Shepherd |
| 4,671,165 | A | 6/1987 | Heidmann et al. |
| 5,291,262 | A | 3/1994 | Dunne |
| 5,616,903 | A | 4/1997 | Springer |
| 5,920,995 | A | 7/1999 | Sammut |
| 6,738,148 | B2 | 5/2004 | Dunne et al. |
| 2005/0021282 | A1 | 1/2005 | Sammut et al. |
| 2006/0077375 | A1* | 4/2006 | Vermillion et al. ......... 356/4.01 |
| 2006/0198421 | A1* | 9/2006 | Schreher ..................... 374/121 |
| 2007/0299675 | A1* | 12/2007 | Pecora ........................... 705/1 |

OTHER PUBLICATIONS

The Strohmeier Group, The Leatherwood Sporter Instructions and Caliber Conversion Chart, 1999, 16 pages.
Leatherwood/HI-LUX Scopes, M-600, www.hi-luxoptics.com/m-600.html, visited Jan. 8, 2008, 2 pages.
RIEGL, Fast and Accurate Measurement of Trees, Buildings, etc., http://www.riegl.com/rangefinders_/rangefinder_applications_/e_hs021.htm, visited Sep. 25, 2006, 2 pages.

* cited by examiner

Primary Examiner—Thomas H Tarcza
Assistant Examiner—Luke D Ratcliffe
(74) Attorney, Agent, or Firm—Stoel Rives LLP

(57) ABSTRACT

Measuring the size of a distant object using a gauge sized according to a range to the object is provided. A user may select an initial target scale size and use an aiming mark to align a rangefinder with the object before determining the range. Indicia may be associated with the gauge, both of which could be displayed in a field of view of an optical sighting device, such as a rangefinder, riflescope, or spotting scope. In addition, the gauge or the indicia, or both may be alterable in response to the determined range. While looking through an eyepiece of the optical sighting device, the user may align the gauge with the object and estimate its size by visually comparing the gauge and object with reference to the indicia. The gauge may be geometrically shaped and may contain a series of spaced apart measuring marks having a logarithmic spacing.

25 Claims, 13 Drawing Sheets

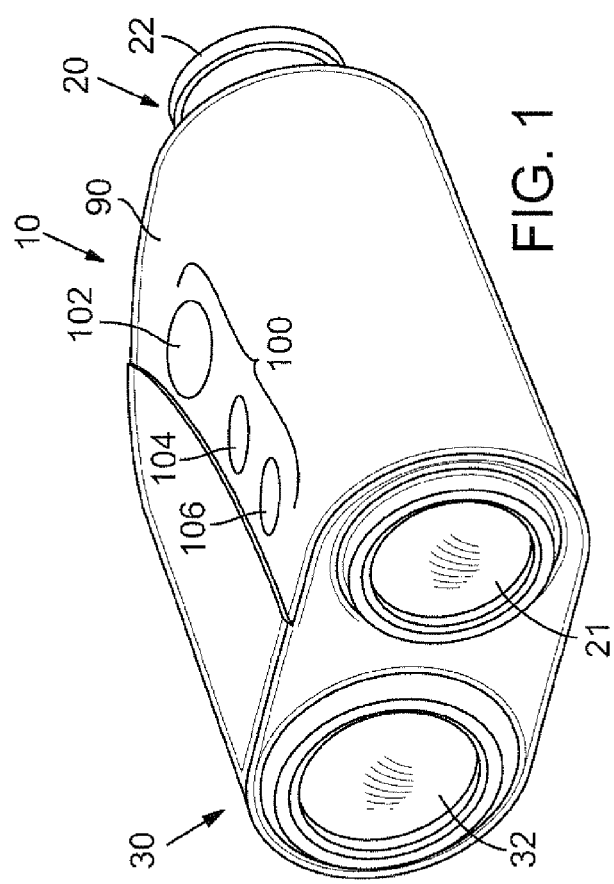
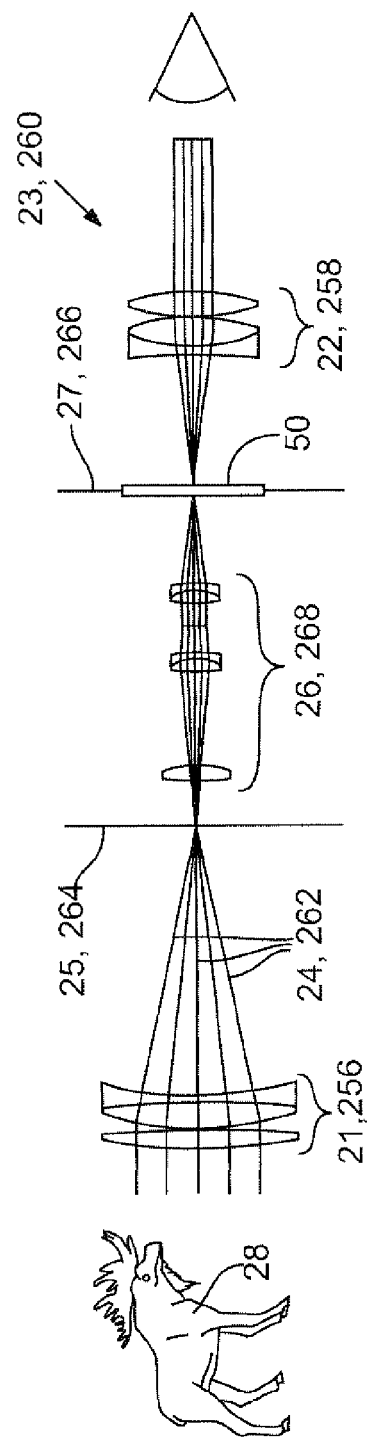
FIG. 1
FIG. 2

SYSTEM AND METHOD FOR MEASURING A SIZE OF A DISTANT OBJECT

RELATED APPLICATIONS

This application claims the benefit under 35 U.S.C. §119(e) of U.S. Provisional Application No. 60/862,389, filed Oct. 20, 2006, which is hereby incorporated by reference in its entirety.

BACKGROUND

This disclosure relates to devices and methods for measuring the size of a distant object, or feature thereof, in a field of view of an optical sighting device, such as a handheld rangefinder, riflescope, or binoculars.

Knowing a dimension of a distant object is essential for many people, such as game hunters, foresters, and property owners. For example, game hunters may not only need to ensure an animal's antlers or horns are of sufficient size to satisfy hunting regulations but they may also wish to determine a trophy quality of the animal before taking it. Similarly, foresters may need to determine a size of a stand of trees to estimate board feet. Likewise, a property owner may wish to estimate the amount of fencing material needed for a stretch of land without manually measuring the dimensions. However, accurately judging the size of the distant object, such as the trophy size of an animal, is difficult even for experienced hunters and guides.

Reticles used with riflescopes and rangefinders and laser surveying instruments are known to allow a user to estimate a range to a distant object and adjust an aiming point for elevation holds. For example, The Leatherwood Sporter™ sold by Hi-Lux, Inc., Torrance, Calif., USA, contains an Auto/Range Reticle that automatically compensates for bullet trajectory based on a range to the target. This reticle contains framing marks that allow the user to overlay, or frame, a known dimension at the target to achieve an elevation adjustment in the scope. By way of example, an average sized deer has a chest height of about 18 inches, deer and antelope are about 54 inches tall, a wild pig is about 48 inches long, and a coyote is about 36 inches long. When the target is located in the riflescope's field of view, the appropriate framing mark is overlaid on the target. For example, if the user is aiming at an adult buck, the user could overlay an 18 inch vertical framing mark on the chest cavity. The magnification of the scope is adjusted until the framing mark frames the dimension of the target. These steps automatically adjust the riflescope relative to the rifle's barrel to compensate bullet drop at the determined range. The user can align the center of the riflescope's crosshairs on the intended point of impact without further adjustment and fire the bullet.

Other known riflescopes having range-finding capability utilize a ratio of known dimensions to approximate range. For example, a riflescope could have reticle features, such as dots, cross-hair pairs, gaps, or posts, having known dimensions. When the reticle and riflescope are properly calibrated, the apparent size of a dot, for example, as viewed through the riflescope will subtend a known angle. By comparing the apparent size of the dot to an image of the target having a known height as viewed through the scope, the range to the target can be estimated. By way of example, the scope and reticle may be calibrated so that the dot covers a circular area having a six inch diameter at a range of 100 yards (i.e. the dot is subtending 5.7 MOA). If the dot covers only ⅔ of a target estimated to be 18 inches high (i.e. the dot covers a circular area having a 12 inch diameter at the unknown range), the estimated range can be calculated using the following formula: Estimated Range=(12 inches/6 inches)×100 yards=200 yards. As these examples have shown, the hunter must perform calculations and use estimations to determine the range to the distant target. This may not only yield inaccurate results, but may require the hunter to receive specialized training or carry additional equipment, such as a calculator or numerous conversion tables.

U.S. Pat. No. 5,291,262 of Dunne describes a sighting scope having means for measuring the apparent width of a target. The user aims the sighting scope at the target, determines the number of reticle markings between left and right edges of the target, and manually enters the number of reticle markings into a microcontroller using a keypad. The microcontroller then uses the number of markings, reticle marking data, and a target distance as determined by a laser rangefinder to calculate the actual width of the target.

In addition, U.S. Pat. No. 6,738,148 of Dunne et al. describes a device having a tree diameter function. First, the horizontal distance to the target tree stem is either entered manually using a keypad or determined by a laser rangefinder. Next, the user depresses increase or decrease buttons on the keypad to position visual brackets so that the brackets adjoin a visual image of a perceived stem diameter at a desired point on the tree stem. After the user depresses the accept button, a processor determines a vertical angle to the point on the tree, calculates the actual height and diameter of the tree at the selected point, and displays the calculated height and diameter on a housing-mounted display of the device. Dunne et al. also describes the device having an upper stem diameter function. The horizontal distance to the target tree stem is either entered manually using a keypad or determined by a laser rangefinder. Next, the user can enter a fixed width at the upper stem and the processor will automatically set visual brackets to the selected upper stem width for the horizontal distance to the target tree. The user can aim the device at the tree stem until the visual brackets are aligned with the left and right sides of the target tree and depress the accept button. After the processor calculates the height at the fixed width selected based upon the horizontal distance to the tree and angle of inclination, it displays the height on the housing mounted display of the device.

However, Dunne and Dunne et al. do not disclose an aiming mark to help aim the rangefinder at the target. In addition, the brackets are positioned at equal intervals which may obstruct the view of the target. Furthermore, the user must divert attention away from the target to the external keypad to enter data or position the visual brackets and the housing mounted display to view the height and/or diameter of the target.

The present inventors have recognized a need for improved devices and methods for measuring the size of a distant object in a field of view of an optical sighting device.

BRIEF DESCRIPTION OF THE DRAWINGS

FIG. 1 is a perspective view of a handheld laser rangefinder;

FIG. 2 is a schematic diagram showing optical elements of the rangefinder of FIG. 1 in accordance with an embodiment;

DETAILED DESCRIPTION OF PREFERRED EMBODIMENTS

Figure 3:
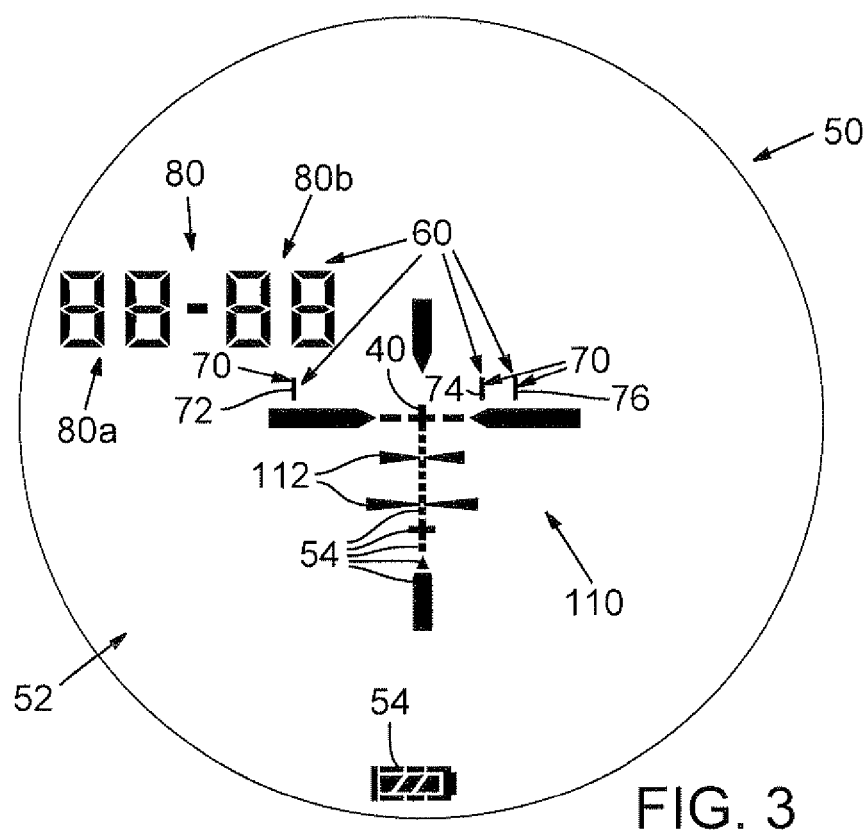
FIG. 3 is a view of a visual display of the rangefinder of FIG. 1 showing a gauge with three measuring marks and two indicia associated with the gauge according to a preferred embodiment.

FIG. 1 illustrates a handheld laser rangefinder 10 according to a first embodiment, incorporating a system for measuring a size of a distant object. With reference to FIG. 1, rangefinder 10 includes an optical sighting device 20 supported in a common housing 90 along with a laser ranging system 30 and associated electronics. Laser ranging system 30 is aimed by viewing the object via optical sighting device 20 and aligning an aiming mark 40 (FIGS. 3 and 4) of a visual display 50 with the object. Laser ranging system 30 projects a laser beam (not shown) at the object. Laser light reflected by the distant object is then received by laser ranging system 30 through rangefinder lens 32 or another lens or receiver, and a lag time between the emission and reception of the laser light is measured to determine a distance (range) from the handheld laser rangefinder 10 to the object. This ranging technique is also known as LIDAR (light detection and ranging). The actual methods employed by laser ranging system 30 for determining the time between emission and reception of laser light and for calculating a line-of-sight range to the target may comprise any of a variety of methods. Laser ranging system 30 may have an operating range from approximately three yards or less, to approximately 1,200 yards or more, depending on the reflectivity and size of the target, and possibly other factors. Skilled persons will appreciate that other ranging methods, such as RADAR (Radio Detection and Ranging), may be used to determine the distance to the object.

According to one embodiment, a user can measure the size of the object using the system incorporated with rangefinder 10. For instance, if a user spots what appears to be a prize moose grazing in a field, rangefinder 10 may be used to measure the width of the moose's antlers. While looking through eyepiece 22 of rangefinder 10, the user can align variable scale 60 (FIGS. 3 and 4) with an image of the antlers as viewed through optical sighting device 20. The size of variable scale 60 may need to be adjusted relative to field of view 52 in order to obtain an accurate measurement at the determined range. For example, if the antlers are 50 inches wide and the moose is 50 yards away, the moose's antlers may occupy nearly 40 percent of the observable field of view 52 (FIGS. 3 and 4) as seen through eyepiece 22 (assuming rangefinder 10 has a 4.5 degree field of view 52 at an 8× magnification). On the other hand, if the moose is 450 yards away, the moose's antlers would probably only occupy 4 percent of the observable field of view 52. Accordingly the size or calibration of variable scale 60 may be adjusted automatically in response to a range measurement acquired by laser ranging system 30 as further described below.

Rangefinder 10 may include a user interface 100 having a power button 102, a mode selector button 104, and trigger button 106. Power button 102 is initially depressed to power up the rangefinder 10 and turn on the rangefinder's electronics, including a processor (FIG. 12) thereof. Mode selector button 104 allows the user to enter a menu mode to activate, deactivate, or adjust features of rangefinder 10. For example, the user may be able to select a gauge type based on the object being measured, such as selecting a moose gauge (FIGS. 10A and 10B), ram curl gauge (FIGS. 11A, 11B, and 11C), or another type of gauge similar to those shown in FIGS. 3, 4, 6, 9A, and 9B. In addition, the user could select units of measurement, such as inches, feet, or meters. Trigger button 106 may be used to initiate laser ranging system 30 thereby measuring the range to the object. Skilled persons will appreciate that user interface 100 may include more or fewer buttons, or controls of a different type, such as keypads, adjustment knobs, wheels, dials, touch screens, wired or wireless electronic interfaces, remote controls, and any other device through which a user can interface with and provide input to rangefinder 10.

Optical sighting device 20 includes an objective or objective lens assembly 21 and eyepiece or eyepiece lens assembly 22 (sometimes referred to as an ocular or ocular lens assembly) supported in housing 90. FIG. 2 is a schematic diagram showing an arrangement of optical elements 23 of rangefinder 10, together with ray trace lines 24 indicating the path of light from the object, such as moose 28, located to the left of the assembly of optical elements 23, as the light travels through the optical system along an optical path. Objective 21 focuses an image of the object at a first (front) focal plane 25 located medially of objective 21 and eyepiece 22. An erector lens assembly 26 interposed between objective 21 and eyepiece 22 inverts the image and refocuses it at a second (rear) focal plane 27 between erector lens assembly 26 and eyepiece 22. Optical elements 23 affect field of view 52 (FIG. 3) which generally refers to what the user can see at one time while looking through eyepiece 22 of optical sighting device 20. For instance, a rangefinder sold by Leupold & Stevens, Inc., Beaverton, Oreg., USA under the trademark RX-III® has an 8× monocular with a field of view of approximately 4.5 degrees. According to another embodiment, a part of erector lens assembly 26 may be movable in response to an optical power selector mechanism to adjust the optical power of rangefinder 10 within a predetermined range of magnification. In general, higher magnification will result in a smaller field of view while lower magnification will result in a larger field of view. In addition, as the user changes the magnification while viewing the object through eyepiece 22, the apparent size of the object may decrease as magnification decreases and increase as magnification increases.

In one embodiment, visual display 50 is located in the optical path between objective 21 and eyepiece 22 and more preferably between erector lens assembly 26 and eyepiece 22, at or adjacent rear focal plane 27. Referring now to FIG. 3, visual display 50 of rangefinder 10 is shown as seen through eyepiece 22 (FIG. 1). Visual display 50 includes a plurality of display elements 54 that may be individually controllable for display or blanking by one or more digital processor components of the electronics of handheld laser rangefinder 10. For purposes of illustration, all display elements 54, including elements of aiming mark 40, variable scale 60, and reticle 110 are shown.

Figure 13:
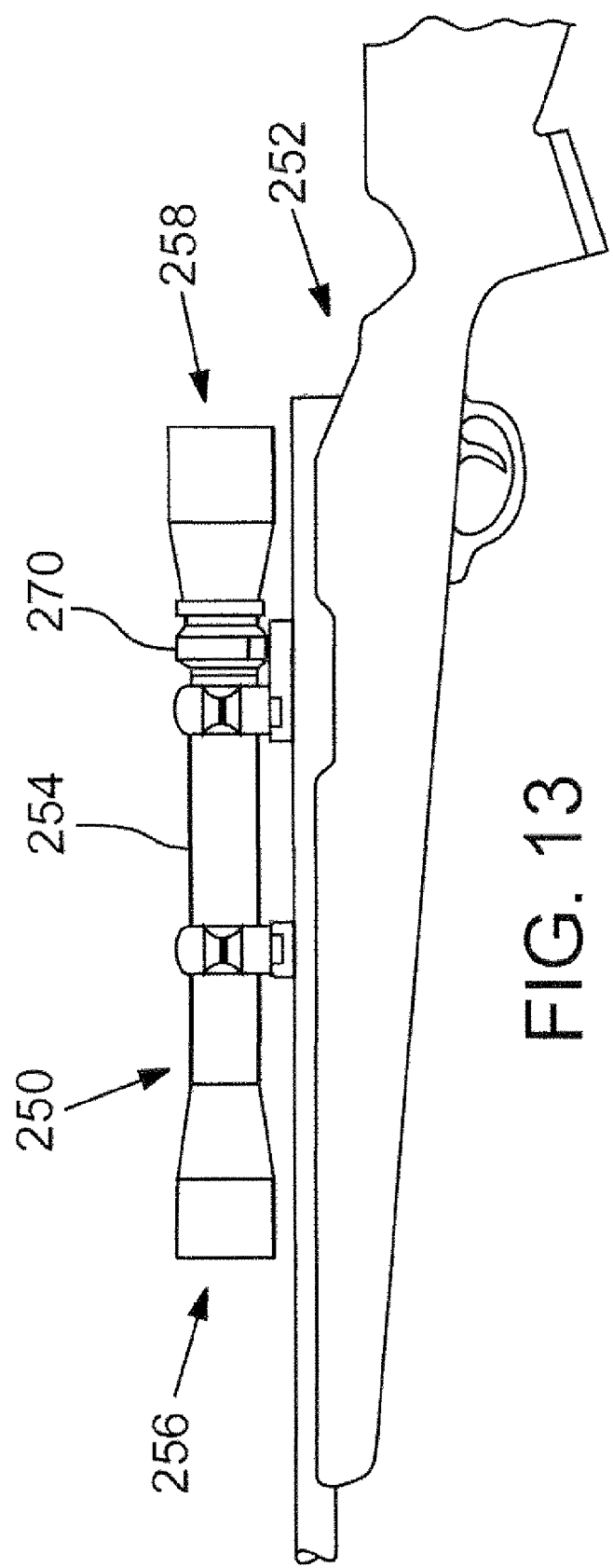
FIG. 13 is a side elevation view of a riflescope mounted on a rifle.

To facilitate aiming at different distances and at different sizes and kinds of targets, reticle 110 may be selected from a variety of different possible reticle configurations. For example, reticle 110 may include aiming mark 40 and secondary aiming marks 112. As previously described, aiming mark 40 can be used to facilitate aiming rangefinder 10 and associated laser ranging system 30 at the object. In addition, reticle 110 may correspond to a reticle used with a riflescope (FIG. 13). Rangefinder 10 could sight-in aiming mark 40 at a first range and secondary aiming marks 112 may be positioned to compensate for ballistic drop at pre-selected incremental ranges beyond the first range, for a selected group of ammunition having similar ballistic characteristics.

Figure 4:
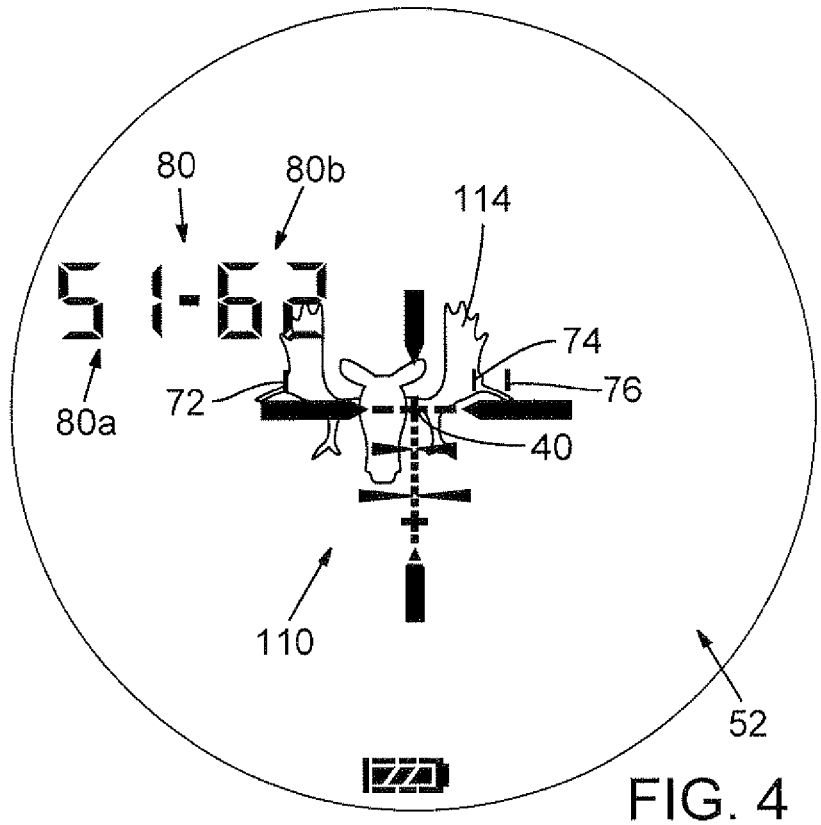
FIG. 4 is an alternative view of the visual display of FIG. 2 showing a width of a moose's antlers being measured.

In one embodiment, variable scale 60 includes gauge 70 and associated indicia 80. Gauge 70 may include a first measuring mark 72, a second measuring mark 74, and a third measuring mark 76. Indicia element 80a may indicate a distance between first measuring mark 72 and second measuring mark 74 while indicia element 80b may indicate a distance between first measuring mark 72 and third measuring mark 76. In FIG. 4, gauge 70 is being used to measure the width of a moose's antlers 114.

Figure 5:
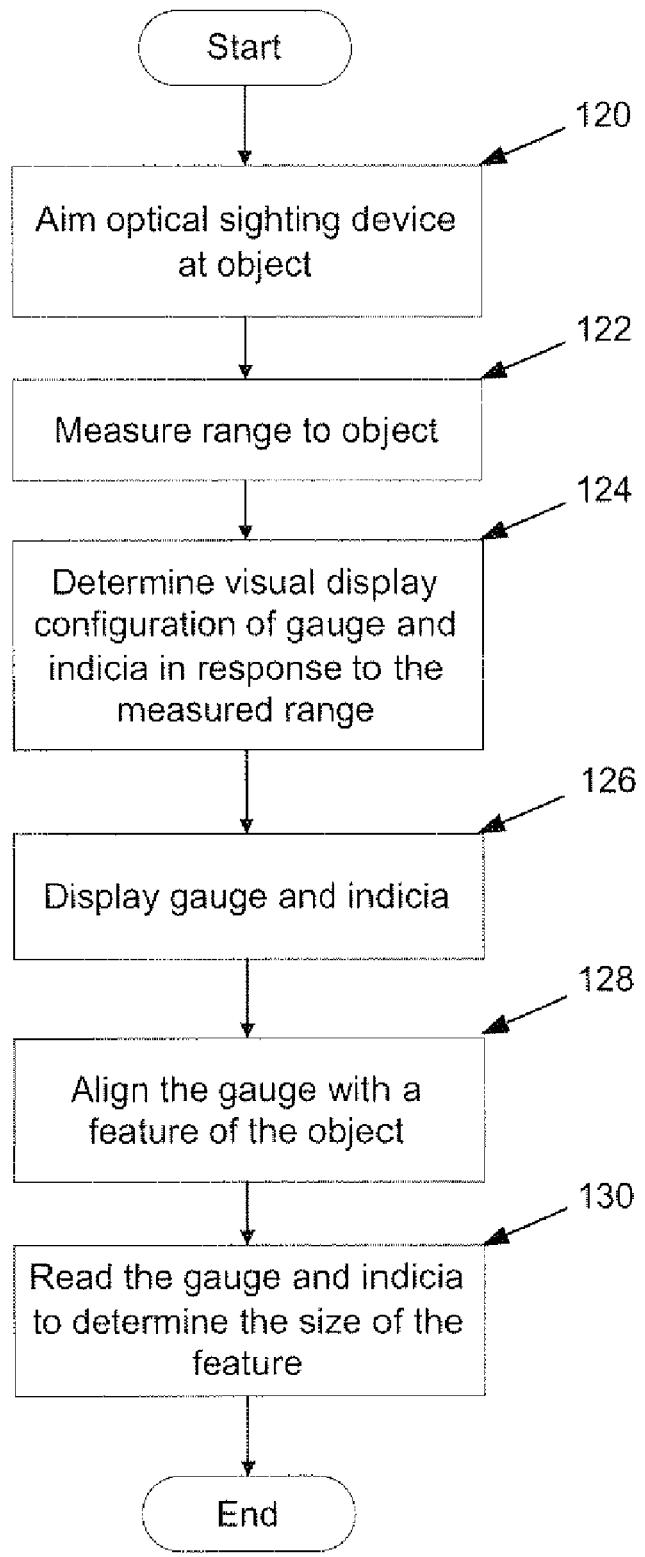
FIG. 5 is a logic flow chart for one method of using the visual display of FIG. 3.

FIG. 5 is a logic flow chart for one possible use of gauge 70. With reference to FIGS. 1, 4, and 5, at step 120, the user aims optical sighting device 20 at the object, such as moose's antlers 114, until the object is in field of view 52 of optical sighting device 20. A range may be measured from optical sighting device 20 to the object at step 122. This may involve the user depressing trigger button 106 (FIG. 1) to activate laser ranging system 30. Once laser ranging system 30 determines the range to the object, a measured range signal may be generated to relay the measured range to a processor (FIG. 12) or other controller, such as a digital signal processor.

At step 124, a configuration of gauge 70 and indicia 80 is determined for visual display 50 based on, or in response to, the measured range. This may involve the processor or controller altering gauge 70, indicia 80, or both in response to the measured range signal. In addition, indicia 80 may be determined to reflect a linear dimension that gauge 70 will represent at the measured range. For example, indicia 80 could reflect that the distance between first measuring mark 72 and second measuring mark 74 represents 51 inches at a range of 100 yards. At step 126, gauge 70 and indicia 80 may be displayed. For example, FIG. 4 shows gauge 70 including three measuring marks (72, 74, and 76). In addition, indicia element 80a shows a distance between first measuring mark 72 and second measuring mark 74 of 51 inches and indicia element 80b shows a distance between first measuring mark 72 and third measuring mark 76 of 62 inches. While steps 124 and 126 may allow gauge 70 and indicia 80 to be displayed properly after the range to the object is measured, gauge 70 and indicia 80 may also be altered and redisplayed based on the measured range.

At step 128, the user aligns gauge 70 with the feature of the object in field of view 52. For example, with reference to FIG. 4, a left most portion of antlers 114 may be aligned with first measuring mark 72 resulting in a right most portion of antlers 114 to fall between second measuring mark 74 and third measuring mark 76. Accordingly, first measuring mark 72 may be considered a datum from which measurements can be made. At step 130, the user can read gauge 70 and indicia 80 to determine the size of the feature. Again, by way of example, the width of antlers 114 (FIG. 4) may be measured by determining the proximity of the right most portion of the antlers 114 to second measuring mark 74 or third measuring mark 76. As shown, the right most portion of antlers 114 appears to be closer to second measuring mark 74, so the user could estimate that the moose's antlers 114 are a little over 51 inches in width. While the logic flow chart of FIG. 5 and visual display 50 of FIG. 4 show gauge 70 with three measuring marks and indicia 80 with two indicia elements, many other gauges and indicia are possible. In alternative embodiments, different gauges and/or indicia may be used such as, for example, the gauges and/or indicia shown in FIGS. 5, 6, 7, 8, 9A, 9B, 10A, 10B, 11A, 11B, and 11C.

In one embodiment, visual display 50 comprises an LCD panel positioned in the optical path of optical sighting device 20 between objective 22 and eyepiece 24. The LCD panel includes normally-transmissive layers so that it does not obscure field of view 52. For example, LCD panel may include transmissive electrodes formed of indium tin oxide (ITO). Display elements 54 may be reflective or opaque, or both, when active. A source of illumination (not shown) may optionally be provided in optical sighting device 20 for illuminating active display elements 54 to enhance their visibility in low ambient light conditions. The illumination source may be integrated in optical sighting device 20 in such a manner so as to prevent illumination from being projected out of objective 22 toward the distant object. In other embodiments (not shown), visual display 50 may comprise any of a variety of visual display devices other than or in addition to an LCD display. For example, visual display 50 may comprise fiber optic displays, light emitting diodes (LEDs), organic light emitting diodes (OLEDs), active matrix liquid crystal displays (AMLCD) and others. Moreover, the display device need not be located in the optical path. For example, a display device such as an LCD, DLP, or another display device outside of the optical path may project an image of display elements 54 onto a prism or reversed beam splitter located in the optical path.

Figure 6:
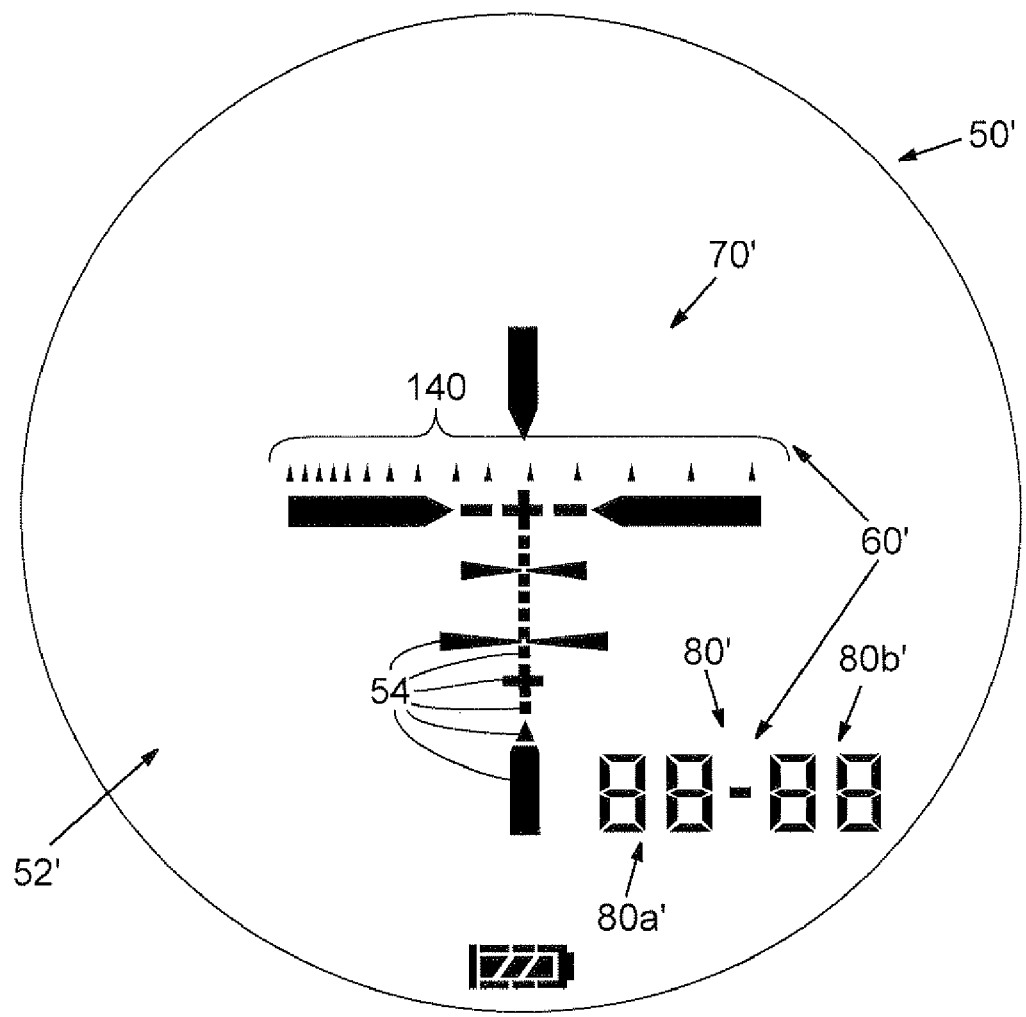
FIG. 6 is a view of a visual display showing a series of logarithmically spaced apart measuring marks selectively displayed in a field of view of the rangefinder of FIG. 1.

Referring now to FIG. 6, an alternate visual display 50' of rangefinder 10 (FIG. 1) is shown as seen through eyepiece 22 (in FIG. 6 reference numerals with the prime symbol, e.g., 50', indicate elements similar to those of the same name in the first embodiment, i.e., visual display 50). Visual display 50' includes variable scale 60' having gauge 70' and indicia 80'. As used herein, indicia generally refers to a single identifying feature of variable scale 60', gauge 70', or both, such as a unit of measurement which may be in inches, feet, meters, or any other unit of measurement. However, indicia may also refer to a plurality of identifying features of variable scale 60', gauge 70', or both, such as indicia element 80a' and indicia element 80b'. In addition, indicia may refer to non-numeric indicia, such as unique letters, symbols or codes that may be used to indicate a dimension meeting a legal requirement, such as a minimum legal size for a game animal, for example.

Figure 7:
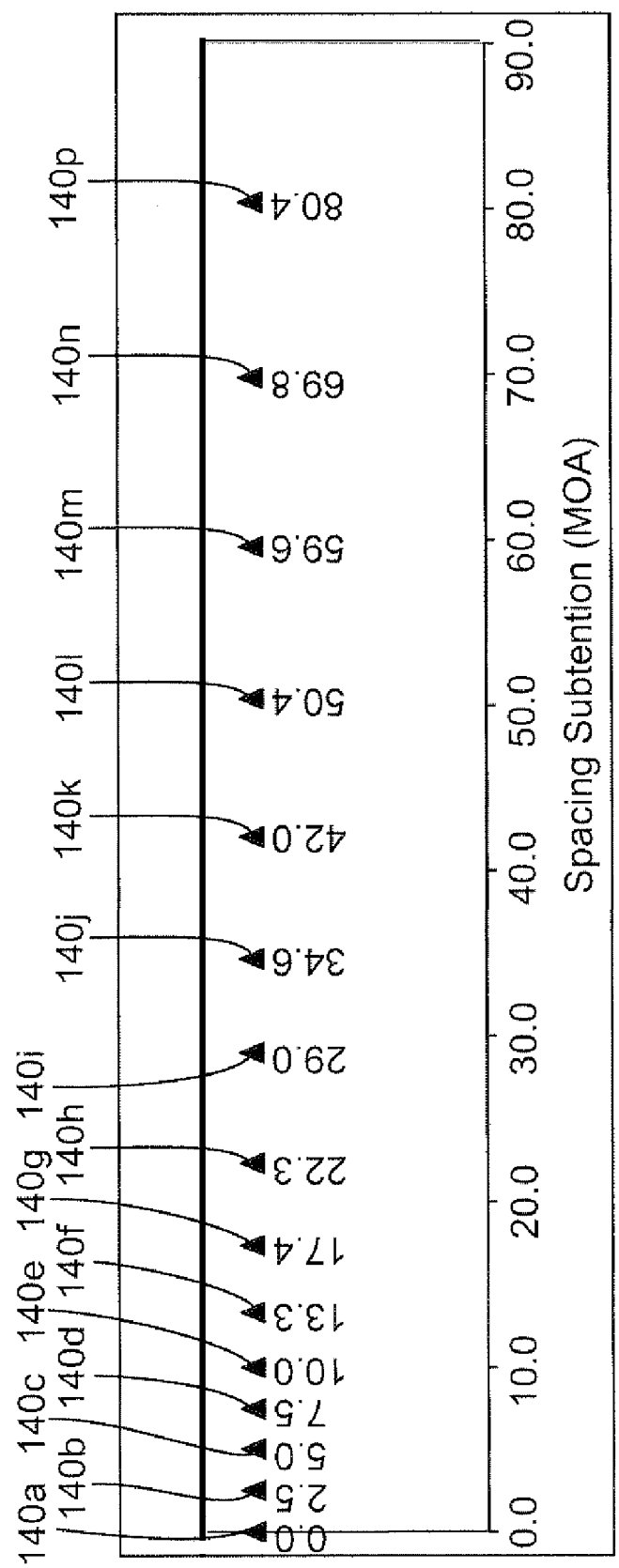
FIG. 7 is an enlarged view of the series of logarithmically spaced apart measuring marks of FIG. 6.

According to one embodiment, gauge 70' is comprised of a series of logarithmically spaced apart measuring marks 140 selectively displayed in field of view 52' of rangefinder 10. Fifteen logarithmically spaced measuring marks 140 are shown in FIG. 6 for illustration purposes only. Logarithmic spacing may allow a more dense concentration of available measuring marks in one area of field of view 52' without excessively propagating the dense structure. This may not only reduce the total number of display elements 54' that need to be coupled to a power source, but may also provide a spacing between two measuring marks that more closely matches the size of a distant object. FIG. 7 shows one example of logarithmically spaced measuring marks 140 in more detail. Measuring marks 140a, 140b, 140c, 140d, and 140e may be spaced equidistantly so as to subtend 2.5 minutes of angle (MOA) in the field of view, for example. Measuring marks 140f-140p may be spaced logarithmically to maximize the ability to fit to any object size at any range with minimal error. For example, the separation between measuring mark 140l and 140m is 9.2 MOA while the spacing between measuring mark 140m and 140n is 10.2 MOA. Furthermore, in some embodiments, a series of measuring marks, such as measuring marks 140a-140e may be placed as close together as the manufacturing process allows or as is visibly distinct, such as a minimum spacing capability for measuring marks on an LCD of 1.7 MOA. Although MOA (one sixtieth of one degree) have been referenced herein, alternative units for measuring angles may be used to reference an angle subtended, such as milliradians (mils).

Figure 8:
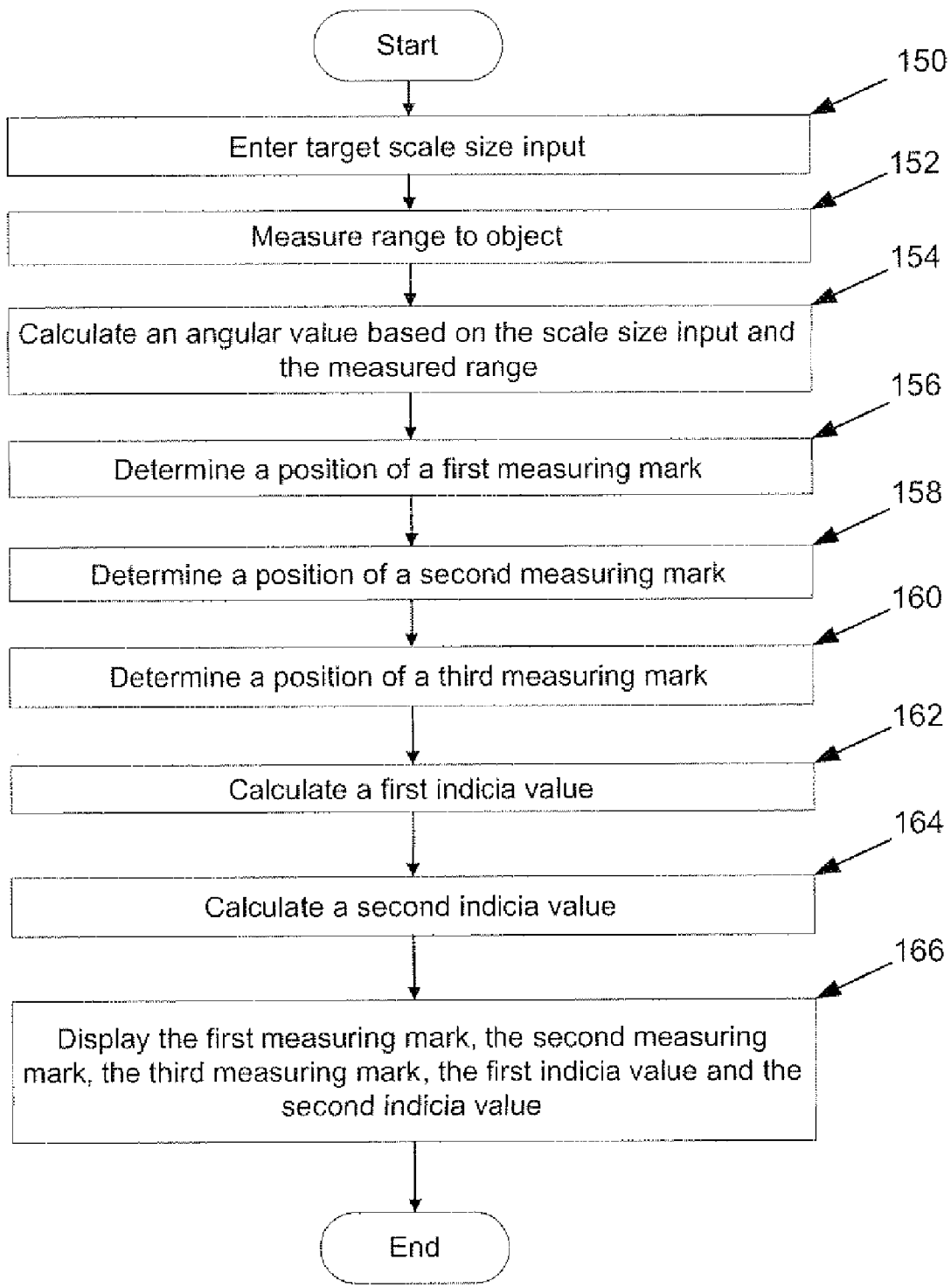
FIG. 8 is a logic flow chart for one method of displaying the visual display of FIG. 3 in the field of view of the rangefinder of FIG. 1.

Referring now to FIG. 8 a logic flow chart for one possible method for selectively displaying logarithmic measuring marks 140 in field of view 52' is shown. At step 150, the user can enter a target scale size input, which is an estimated target (or object) size. For example, the user could enter 50 inches if hunting moose in Alaska, which requires the antlers of a bull moose to have a spread of 50 inches or more measured in a straight line perpendicular to the center line of the moose's skull. In addition, a nominal scale size, such as 50 inches, could be used by default. At step 152, the range to the object, such as moose 28 (antlers 114 in FIG. 4), may be measured in any manner, such as those previously described. An angular value in field of view 52' subtended by the scale size input may be calculated at step 154 according to Equation 1.

$$Subtension_{MOA} = \arctan\left(\frac{Scale\ Size_{inches}}{(Range_{yards}) \times 36}\right) \times 60 \quad \text{Equation 1}$$

For example, if the user enters 50 inches for the scale size input and the measured range to the object is 50 yards, a subtension of the scale size input at the range is about 95.5 MOA. However, if the user enters 50 inches for the scale size input and the measured range to the object is 450 yards, a subtension of the scale size input at the range is about 10.6 MOA.

According to one embodiment, three of the logarithmically spaced measuring marks 140 of FIG. 6 are selectively displayed in field of view 52'. Each one of the three displayed measuring marks may correspond to one of the three measuring marks 72, 74, and 76 of FIG. 4. At step 156, a position of a first one of logarithmic measuring marks 140 may be calculated. With reference to FIG. 4, the position of the first one of logarithmic measuring marks 140 may actually be the position of second measuring mark 74. With reference to FIG. 6, rangefinder 10 could have information stored in memory 232 (FIG. 12) regarding how many logarithmic measuring marks 140 gauge 70' contains and a spacing between each of the logarithmic measuring marks 140. For example, with reference to FIG. 7, rangefinder 10 may have a lookup table stored in memory 232 indicating the distance between measuring mark 140a and 140p is 80.4 MOA. The angular value calculated in step 154 may be compared to each known distance between each of measuring marks 140a-140p and a reference point, such as measuring mark 140a. The position of the first one of logarithmic measuring marks 140 could be one of measuring marks 140a-140p having a separation from measuring mark 140a greater than or equal to the angular value of the scale size input calculated in step 154 or the right most measuring mark, such as measuring mark 140p. By way of example, if the user enters 50 inches for the scale size input and the measured range to the object is 50 yards (e.g. a scale subtension of 95.5 MOA), measuring mark 140p may be selected as the first one of logarithmic measuring marks 140. Accordingly, with reference to FIG. 4, second measuring mark 74 would correspond to logarithmic measuring mark 140p of FIG. 7. By way of another example, if the user enters 50 inches for the scale size input and the measured range to the object is 450 yards (e.g. a scale subtension of 10.6 MOA), measuring mark 140f may be selected as the first one of logarithmic measuring marks 140. Accordingly, with reference to FIG. 4, second measuring mark 74 would correspond to logarithmic measuring mark 140f of FIG. 7.

At step 158, a position of a second one of logarithmic measuring marks 140 may be calculated so that a linear dimension at the measured range that is subtended by a separation between first measuring mark 72 and second measuring mark 74 (FIG. 4) is substantially equal to the scale size input. With reference to FIG. 4, the position of the second one of logarithmic measuring marks 140 may actually be the position of first measuring mark 72. In step 158, the spacing between the first one of logarithmic measuring marks 140 and a reference point, such as measuring mark 140a may be determined. In one embodiment, the width of each measuring mark 140 is not included in the spacing measurement. In another embodiment, the position of the second one of logarithmic measuring marks 140 may be selected as one of logarithmic measuring marks 140a-140e. With reference to FIG. 4, this may allow the distance between first measuring mark 72 and second measuring mark 74 to be as close as possible to the scale size entered at step 150. By way of example, if the user enters 50 inches for the scale size input and the measured range to the object is 50 yards (e.g. a scale subtension of 95.5 MOA), measuring mark 140a may be selected as the second one of logarithmic measuring marks 140. Accordingly, with reference to FIG. 4, first measuring mark 72 would correspond to logarithmic measuring mark 140a of FIG. 7. By way of another example, if the user enters 50 inches for the scale size input and the measured range to the object is 450 yards (e.g. a scale subtension of 10.6 MOA), measuring mark 140b may be selected as the second one of logarithmic measuring marks 140. Accordingly, with reference to FIG. 4, first measuring mark 72 would correspond to logarithmic measuring mark 140b of FIG. 7.

If logarithmic measuring mark 140a were used as the second one of logarithmic measuring marks 140, the distance between first measuring mark 72 and second measuring mark 74 (FIG. 4) would be approximately 63 inches at a range of 450 yards. However, by using logarithmic measuring mark 140b as the second one of logarithmic measuring marks 140, the distance between first measuring mark 72 and second measuring mark 74 (FIG. 4) is approximately 51 inches at a range of 450 yards. Therefore, by using logarithmic measuring mark 140b instead of 140a, the distance between first measuring mark 72 and second measuring mark 74 (FIG. 4) is much closer to the scale size input of 50 inches.

According to one embodiment, the reference point may be mark 140e and the position of the first one of logarithmic measuring marks 140 (e.g., second measuring mark 74) may be determined with reference to mark 140e. The second one of logarithmic measuring marks 140 (e.g., first measuring mark 72) may then be determined with reference to the determined first one of logarithmic measuring marks 140 (e.g., second measuring mark 74), the scale size input, and the known spacing between each of the logarithmic measuring marks 140 (e.g., marks 140a through 140p). This helps ensure that the distance between first measuring mark 72 and second measuring mark 74 is as close as possible to the scale size input. If the distance between second measuring mark 74 and mark 140e is closer to the scale size input than the distance between second measuring mark 74 and other marks (e.g., mark 140d or mark 140f), then mark 140e may be selected as first measuring mark 72 and activated. However, if the distance between second measuring mark 74 and another mark (e.g., mark 140d) is closer to the scale size input, then a mark other than mark 140e may be used, such as mark 140d. Thus, by using mark 140e (or any other mark 140a through 140p) as the reference point, refinement ticks to the left and/or right of the reference point are available to get the distance between first measuring mark 72 and second measuring mark 74 as close as possible to the scale size input.

At step 160, a position of a third one of logarithmic measuring marks 140 may be calculated so that a linear dimension at the measured range that is subtended by a separation between first measuring mark 72 and third measuring mark 76 (FIG. 4) is greater than the scale size input. With reference to FIG. 4, the position of the third one of logarithmic measuring marks 140 may actually be the position of third measuring mark 76. In step 160, the third one of logarithmic measuring marks 140 may be determined as one of the logarithmic measuring marks 140 that is immediately to the right of the first one of logarithmic measuring marks 140. If there are no more logarithmic measuring marks 140 to choose from, there may be no third one of logarithmic measuring marks 140. By way of example, if the user enters 50 inches for the scale size input and the measured range to the object is 50 yards (e.g. a scale subtension of 95.5 MOA), none of the logarithmic measuring marks 140 may be selected because the second one of logarithmic measuring marks 140 was already determined to be logarithmic measuring mark 140p (the right most of logarithmic measuring marks 140). Accordingly, with reference to FIG. 4, third measuring mark 76 may not be shown. By way of another example, if the user enters 50 inches for the scale size input and the measured range to the object is 450 yards (e.g. a scale subtension of 10.6 MOA), logarithmic measuring mark 140g may be selected as the third one of logarithmic measuring marks 140. Accordingly, with reference to FIG. 4, third measuring mark 76 would correspond to logarithmic measuring mark 140g of FIG. 7.

At step 162, a first indicia value may be calculated so that the first indicia value, such as indicia element 80a (FIG. 4), represents a linear dimension at the measured range that is subtended by a separation between first measuring mark 72 and second measuring mark 74 (FIG. 4). Indicia element 80a may be determined by calculating the distance between first measuring mark 72 and second measuring mark 74 in MOA. The actual width of each of logarithmic measuring marks 140 may or may not be included in the distance calculation. Equation 2 may be used to convert the distance in MOA to inches at the measured range.

$$Indicia\ Value_{inches} = \tan\left(\frac{Subtension_{MOA}}{60}\right) \times (Range_{yards}) \times 36 \quad \text{Equation 2}$$

Likewise, at step 164, a second indicia value may be calculated so that the second indicia value, such as indicia element 80b (FIG. 4), represents a linear dimension at the measured range that is subtended by a separation between first measuring mark 72 and third measuring mark 76 (FIG. 4). Indicia element 80b may be determined by calculating the distance between first measuring mark 72 and third measuring mark 76 in MOA. The actual width of each of logarithmic measuring marks 140 may or may not be included in the distance calculation. Equation 2 may be used to convert the distance in MOA to inches at the measured range.

By way of example, if the user enters 50 inches for the scale size input and the measured range to the object is 100 yards (e.g. a scale subtension of 47.7 MOA), first measuring mark 72 (FIG. 4) may correspond to logarithmic measuring mark 140a of FIG. 7, second measuring mark 74 (FIG. 4) may correspond to logarithmic measuring mark 140l of FIG. 7, and third measuring mark 76 (FIG. 4) may correspond to logarithmic measuring mark 140m of FIG. 7. Accordingly, indicia element 80b may be calculated as 51 inches, which is approximately the scale size input. Likewise, indicia element 80a may be calculated as 62 inches, which is incrementally greater than the scale size input.

At step 166, the first one of logarithmic measuring marks 140, the second one of logarithmic measuring marks 140, the third one of logarithmic measuring marks 140, the first indicia value, and the second indicia value may be displayed in field of view 52 of rangefinder 10 as illustrated in FIG. 4 by measuring marks 72, 74, and 76 and indicia 80a and 80b.

As used herein, except as the context otherwise dictates, the subtension of a mark or marks on a reticle refers to the angular field of view (angle of view) subtended by the reticle mark or marks. As used herein, a linear dimension at the determined range that is "subtended by" a gauge or by a separation between a first displayed measuring mark and a second displayed measuring mark refers to a linear dimension that subtends an angle of view that is also subtended by the gauge (or the separation between the first displayed measuring mark and the second displayed measuring mark) as viewed through an optical sighting device. For example, gauge 70 (FIG. 3) may be overlaid on a feature of the target at the determined range so that a linear dimension of gauge 70 may be used to measure the size of the feature of the distant object when viewed through eyepiece 22 of optical sighting device 20.

Figure 9A:
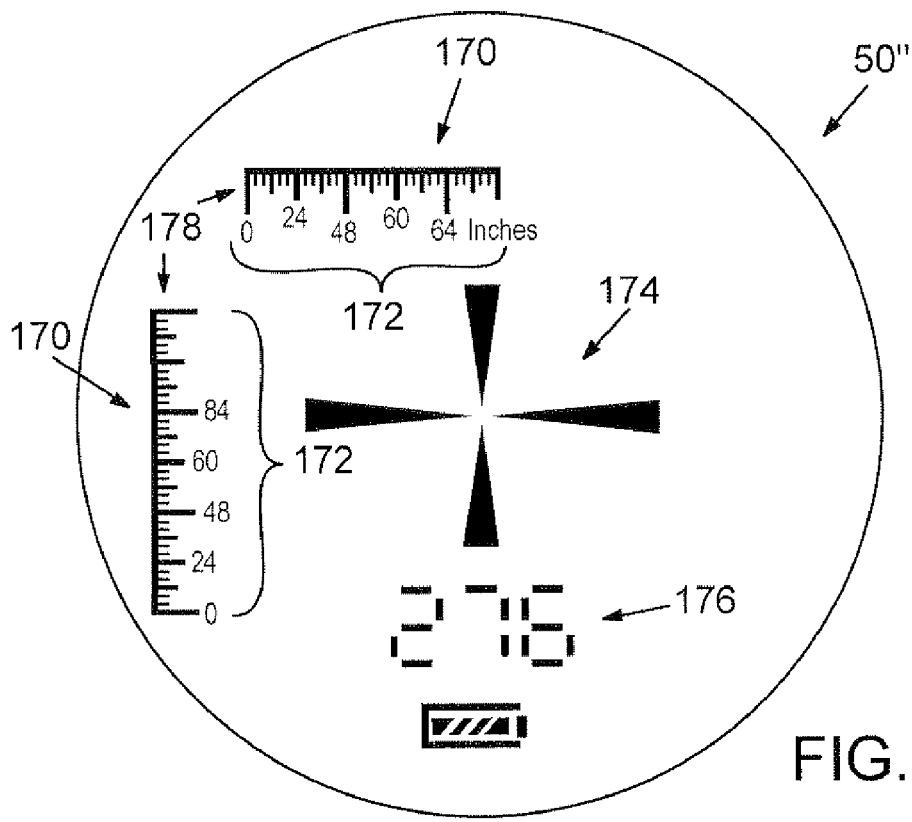
FIG. 9A is a view of a visual display of the rangefinder of FIG. 1 showing a gauge and indicia associated with the gauge in 8× magnification according to a second embodiment.
Figure 9B:
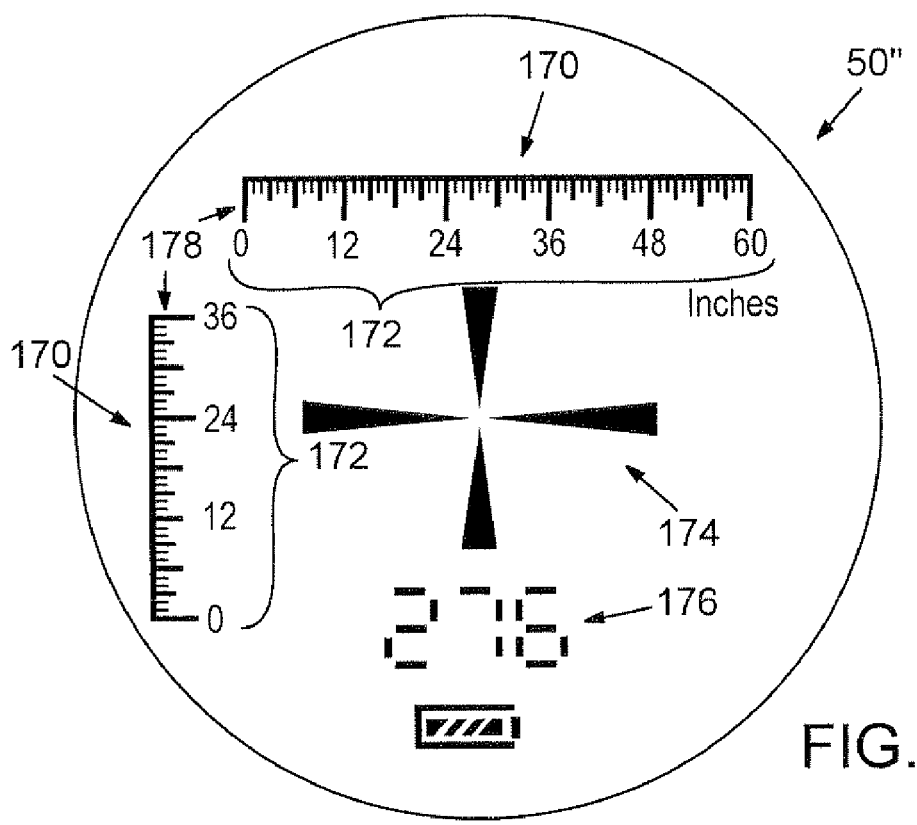
FIG. 9B is an alternative view of the visual display of FIG. 9A showing the gauge and indicia associated with the gauge in 25× magnification.

Referring now to FIGS. 9A and 9B, a second embodiment of visual display 50" of rangefinder 10 (FIG. 1) is shown with two gauges 170 and associated indicia 172 (in FIGS. 9A and 9B reference numerals with the prime symbol, e.g., 50", indicate elements similar to those of the same name in the first embodiment, i.e., visual display 50). Aiming mark 174 of visual display 50" can be used to facilitate aiming rangefinder 10 and associated laser ranging system 30 at the object as previously described with reference to FIGS. 3, 4, and 6. Visual display 50" may also include a data readout 176 indicative of a range to the distant object as determined by laser ranging system 30. However, data readout 176 may be indicative of other information, such as additional information about gauge 170 or indicia 172. With reference to FIG. 9A, the user may see visual display 50" when looking through eyepiece 22 of handheld laser rangefinder 10 having an 8× magnification, for example. With reference to FIG. 9B, the user may see visual display 50" when looking through an eyepiece (not shown) of a spotting scope (not shown) having an 25× magnification, for example. However, visual display 50" may also be seen by looking through an optical sighting device having an adjustable magnification, such as a riflescope (FIG. 13).

Variable scale 178 may be responsive to an output from laser ranging system 30 to alter gauge 170, indicia 172, or both, so that indicia 172 represents a linear dimension at the determined range that is subtended by gauge 170. For example, gauge 170 could be altered and displayed according to a method similar to those discussed with reference to FIGS. 4, 5, 6, 7, and 8. In addition, gauge 170 could change size in response to the determined range by selecting appropriate pixels of an AMLCD or other suitable display. Furthermore, indicia 172 may be changed to allow measurement of the object at the determined range. For example, instead of altering gauge 170, indicia 172 may be changed by replacing 24 inches with 48 inches. However, gauge 170 and indicia 172 may both be altered in response to the determined range. While indicia 172 is shown in inches, other units of measurement would be suitable, such as feet or meters.

Figure 10A:
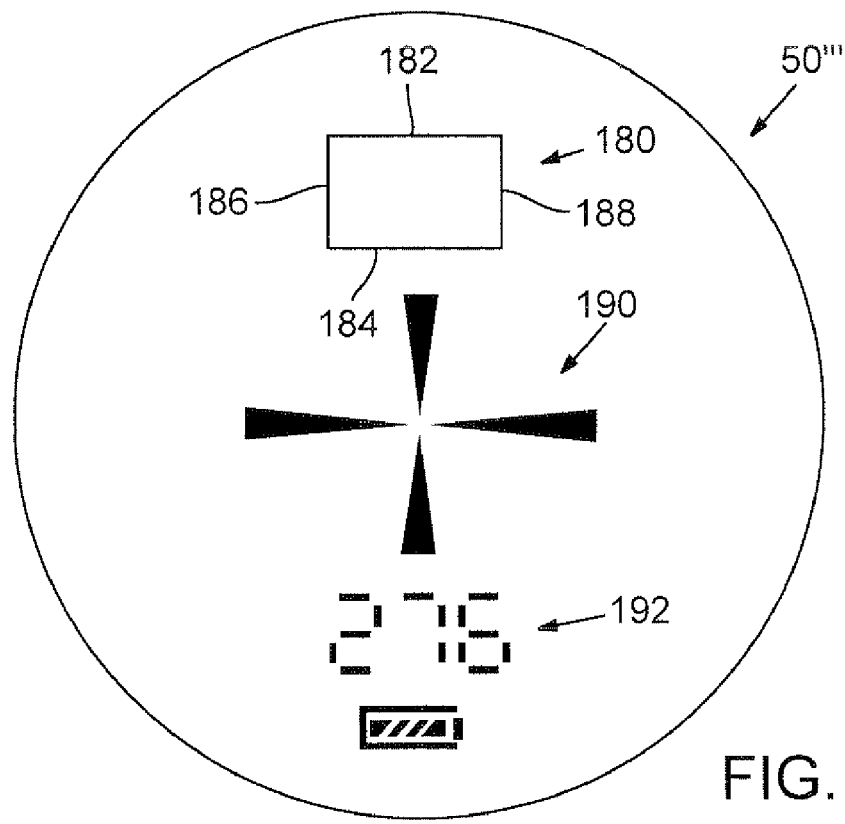
FIG. 10A is a view of a visual display of the rangefinder of FIG. 1 showing a 60 inch moose gauge in 8× magnification according to a third embodiment.
Figure 10B:
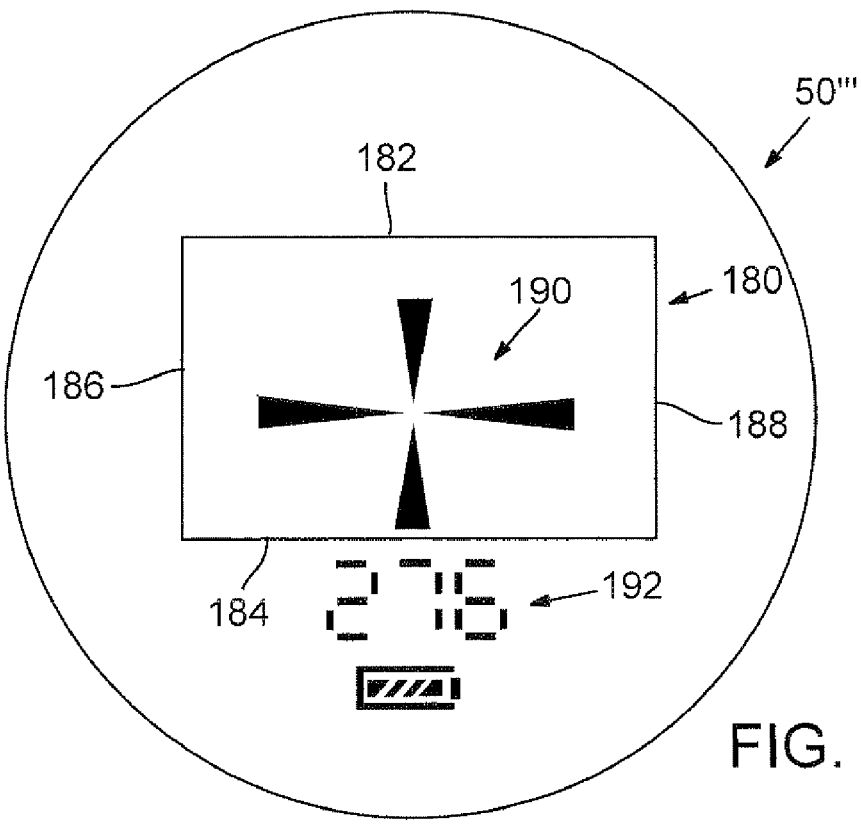
FIG. 10B is an alternative view of the visual display of FIG. 10A showing the 60 inch moose gauge in 25× magnification.

Referring now to FIGS. 10A and 10B, a third embodiment of visual display 50' of rangefinder 10 (FIG. 1) is shown with gauge 180 having a first vertical reference point 182, a second vertical reference point 184, a first horizontal reference point 186, and a second horizontal reference point 188 for measuring a size of the object (in FIGS. 10A and 10B reference numerals with the prime symbol, e.g., 50''', indicate elements similar to those of the same name in the first embodiment, i.e., visual display 50). While reference points 182, 184, 186, and 188 are shown as sides of a rectangle, other reference points may be used, such as measuring marks similar to those shown with reference to FIGS. 3, 4, 6, 7, 9A, and 9B. In addition, while gauge 180 takes the shape of a rectangle, other geometric shapes could be used, such as a polygon, triangle, parallelogram, circle, or other curved shapes.

Aiming mark 190 of visual display 50''' can be used to facilitate aiming rangefinder 10 and associated laser ranging system 30 at the object as previously described with reference to FIGS. 3, 4, and 6. Visual display 50''' may also include a data readout 192 indicative of a range to the distant object as determined by laser ranging system 30. However, data readout 192 may be indicative of other information, such as additional information about gauge 180. Furthermore, indicia (not shown) may be included to indicate a linear dimension at the determined range that is subtended by gauge 180.

With reference to FIG. 10A, the user may see visual display 50' when looking through eyepiece 22 of handheld laser rangefinder 10 having an 8× magnification, for example. With reference to FIG. 10B, the user may see visual display 50' when looking through an eyepiece of a spotting scope having an 25× magnification, for example. However, visual display 50''' may also be seen by looking through an optical sighting device having an adjustable magnification, such as a riflescope (FIG. 13).

Gauge 180 may be responsive to an output from laser ranging system 30 to alter gauge 180, the indicia, or both, so that the indicia represents a linear dimension at the determined range that is subtended by gauge 180. For example, gauge 180 could be altered and displayed according to a method similar to that discussed with reference to FIGS. 4, 6, 7, 9A, and 9B. In addition, gauge 180 could change size in response to the determined range by selecting appropriate pixels of an AMLCD or other suitable display. Furthermore, the indicia may be changed to allow measurement of the object at the determined range. For example, a series of selectively displayed concentric geometric shapes could be spaced at six inch or one foot increments. In addition, a grid could be incremented at a similar spacing and have major and minor divisions indicated by line weight or a programmable go or no-go setting. For example, a 60 inch width for a moose or 26 inch width for a mule deer could be provided.

Referring now to FIGS. 11A, 11B, 11C, and 11D, a fourth embodiment of visual display 50'''' of rangefinder 10 (FIG. 1) is shown with gauges 200, 201, and 211 (in FIGS. 11A, 11B, 11C, and 11D reference numerals with the prime symbol, e.g., 50'''', indicate elements similar to those of the same name in the first embodiment, i.e., visual display 50). Aiming mark 202 of visual display 50'''' can be used to facilitate aiming rangefinder 10 and associated laser ranging system 30 at the object as previously described with reference to FIGS. 3, 4, and 6. Visual display 50'''' may also include a data readout 204 indicative of a range to the distant object as determined by laser ranging system 30. However, data readout 204 may be indicative of other information, such as additional information about gauge 200. Furthermore, indicia (not shown) may be included to indicate a linear dimension at the determined range that is subtended by gauge 200.

Figure 11A:
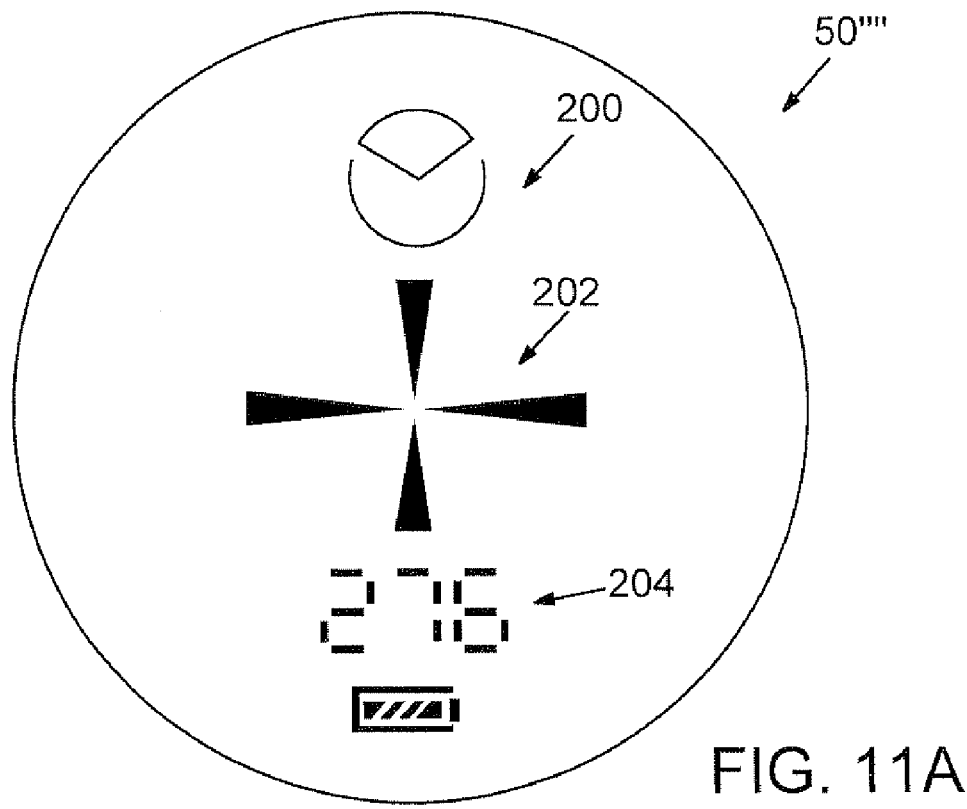
FIG. 11A is a view of a visual display of the rangefinder of FIG. 1 showing a 37 inch ram full curl gauge in 8× magnification according to a fourth embodiment.
Figure 11B:
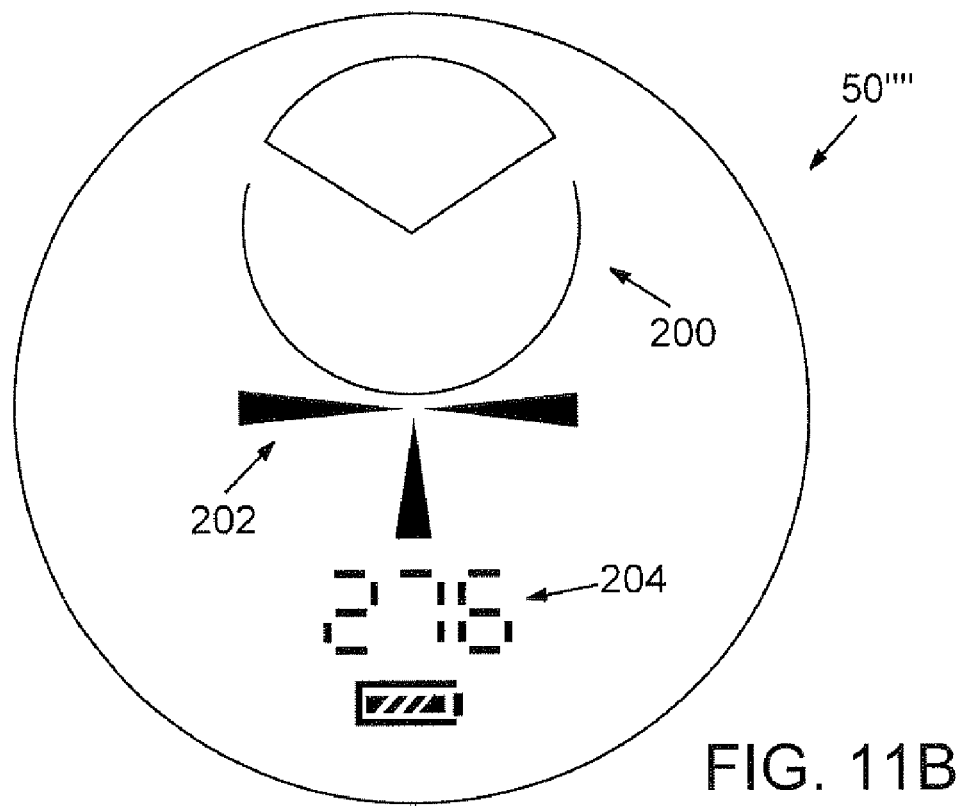
FIG. 11B is an alternative view of the visual display of FIG. 11A showing the 37 inch ram full curl gauge in 25× magnification.
Figure 11C:
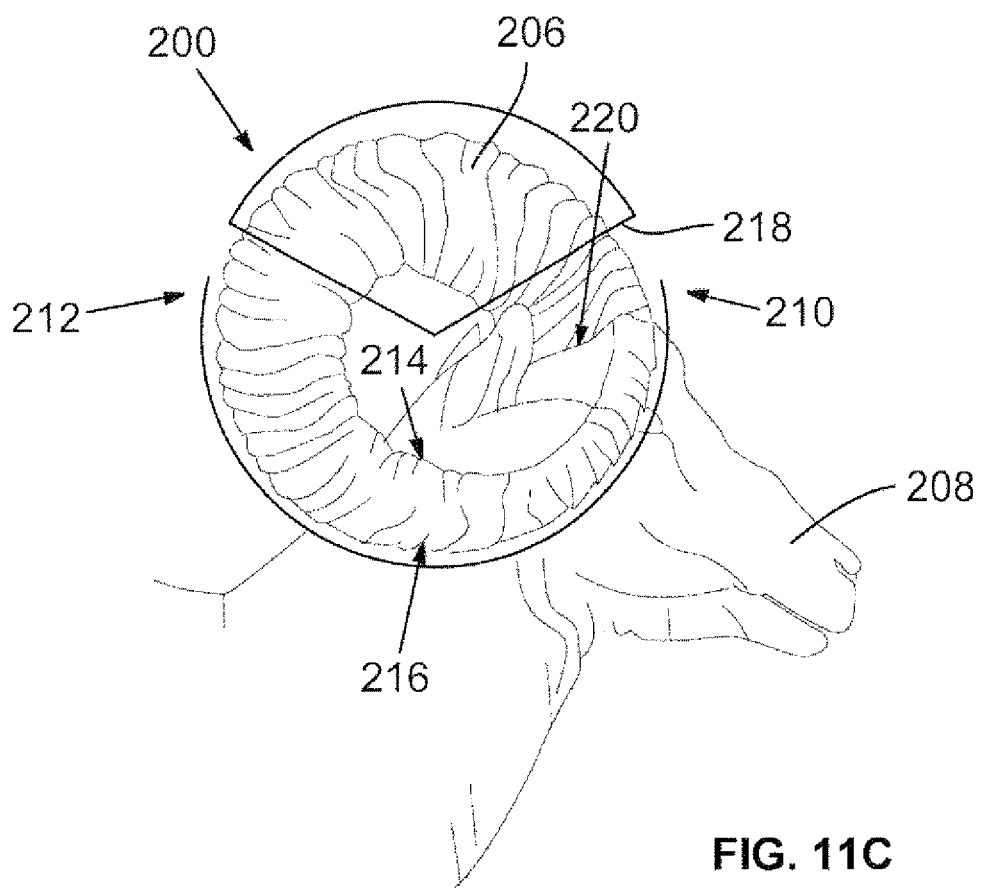
FIG. 11C is a view through an optical sighting device of the rangefinder of FIG. 1 showing the 37 inch ram full curl gauge of FIG. 11B aligned with a horn of a ram having a full curl.

With reference to FIG. 11A, the user may see visual display 50'''' when looking through eyepiece 22 of handheld laser rangefinder 10 having an 8× magnification, for example. With reference to FIG. 11B, the user may see visual display 50'''' when looking through an eyepiece of a spotting scope having an 25× magnification, for example. However, visual display 50'''' may also be seen by looking through an optical sighting device having an adjustable magnification, such as a riflescope (FIG. 13). FIG. 11C shows gauge 200 aligned with horn 206 of ram 208. A right side 210 of gauge 200 may be used to measure horn 206 when ram 208 is oriented as shown. A left side 212 of gauge 200 may be used to measure a ram 208 facing the other direction. Various regions have hunting regulations requiring horn 206 to have a full curl, as shown in FIG. 11C. Gauge 200 may be used to measure the curl of horn 206 to ensure compliance with hunting regulations. For example, gauge 200 may be used to measure a 37 inch horn of a ram. Other gauge shapes and sizes may also be used. For example, gauge 200 may contain indication of an inside circumference 214 and outside circumference 216 of horn 206. In addition, gauge 200 may be aligned with horn 206 in a different manner. For example, gauge portion 218 may be aligned with base 220 of horn 206.

Figure 11D:
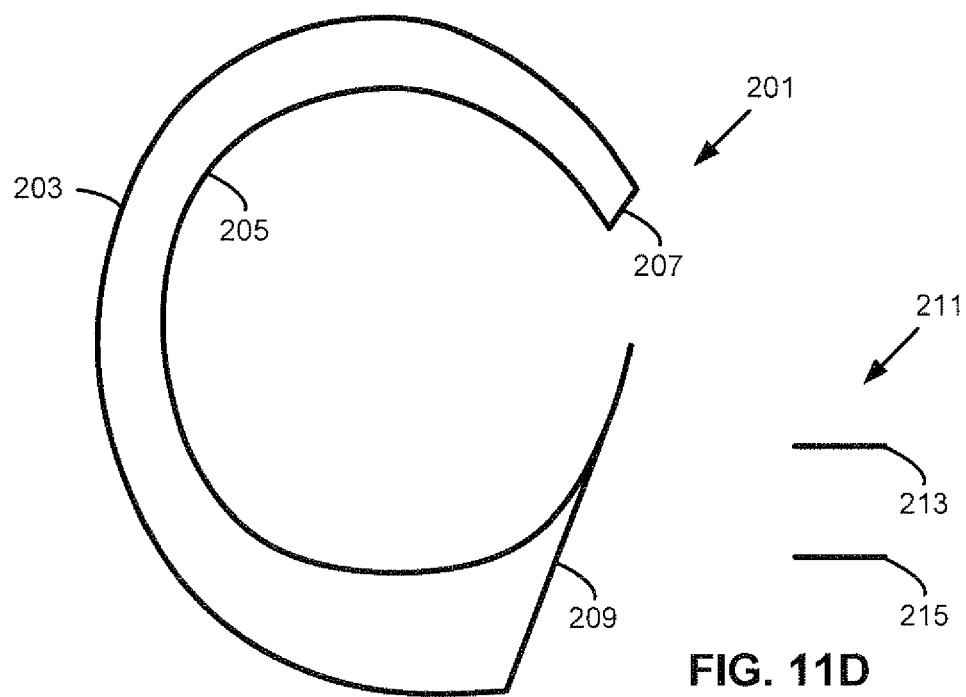
FIG. 11D illustrates a ram curl gauge according to another embodiment.

FIG. 11D shows a gauge 201 that may be used to measure a ram horn according to another embodiment. Gauge 201 includes two curves, curve 203 and curve 205, that may be compared to an outside perimeter of a ram horn, such as horn 206. Lines 207 and 209 may be provided to connect the ends of curve 203 to the ends of curve 205. According to one embodiment, curve 205 has the same length (e.g., perimeter) as curve 203, but is more tightly curved (e.g., has a smaller radius) than curve 203. Thus, either curve 203 or curve 205 may be compared to an outside perimeter of a ram horn based on how tightly the ram's horn curves. For example, the user may see gauge 201 when looking through eyepiece 22 of handheld laser rangefinder 10. Gauge 201 may have been sized based on the range to the ram and the magnification so that the length of curve 203 and curve 205 is approximately 38 inches at that range and magnification. The user can then choose either curve 203 or curve 205 to compare to the ram's horn to determine whether the ram has a horn in accordance with hunting regulations. Gauge 201 may have a different orientation (e.g., flipped left to right, top to bottom, or rotated) and may contain only one curve or more than two curves. The curves 203 and 205 may be sized based on user input. For example, the user could input a desired length of the curve(s), such as 36 inches to measure 36 inch ram horns. In addition, the curves 203 and 205 may resize based on range and/or magnification.

According to one embodiment, gauge 211 may be provided to measure a thickness of the ram's horn. For example, lines 213 and 215 may be set a certain distance to ensure that the ram's horn has a required minimum thickness. Any of the gauges illustrated with respect to FIGS. 3, 4, 6, 7, 9A, 9B, 10A, and 10B maybe used in addition to or in place of lines 213 and 215 to measure the thickness of the ram's horn. In addition, ticks or marks may be included on curve 203, curve 205, line 207, and/or line 209 to measure the thickness.

Gauges 200, 201, and 211 may be responsive to an output from laser ranging system 30 to alter gauges 200, 201, and 211, the indicia, or both, so that the indicia represents a linear dimension at the determined range that is subtended by gauges 200, 201, and 211. For example, gauges 200, 201, and 211 could be altered and displayed according to a method similar to that discussed with reference to FIGS. 4, 5, 6, 7, 8, 9A, 9B, 10A, and 10B. In addition, gauges 200, 201, and 211 could change size in response to the determined range by selecting appropriate pixels of an AMLCD or other suitable display.

Figure 12:
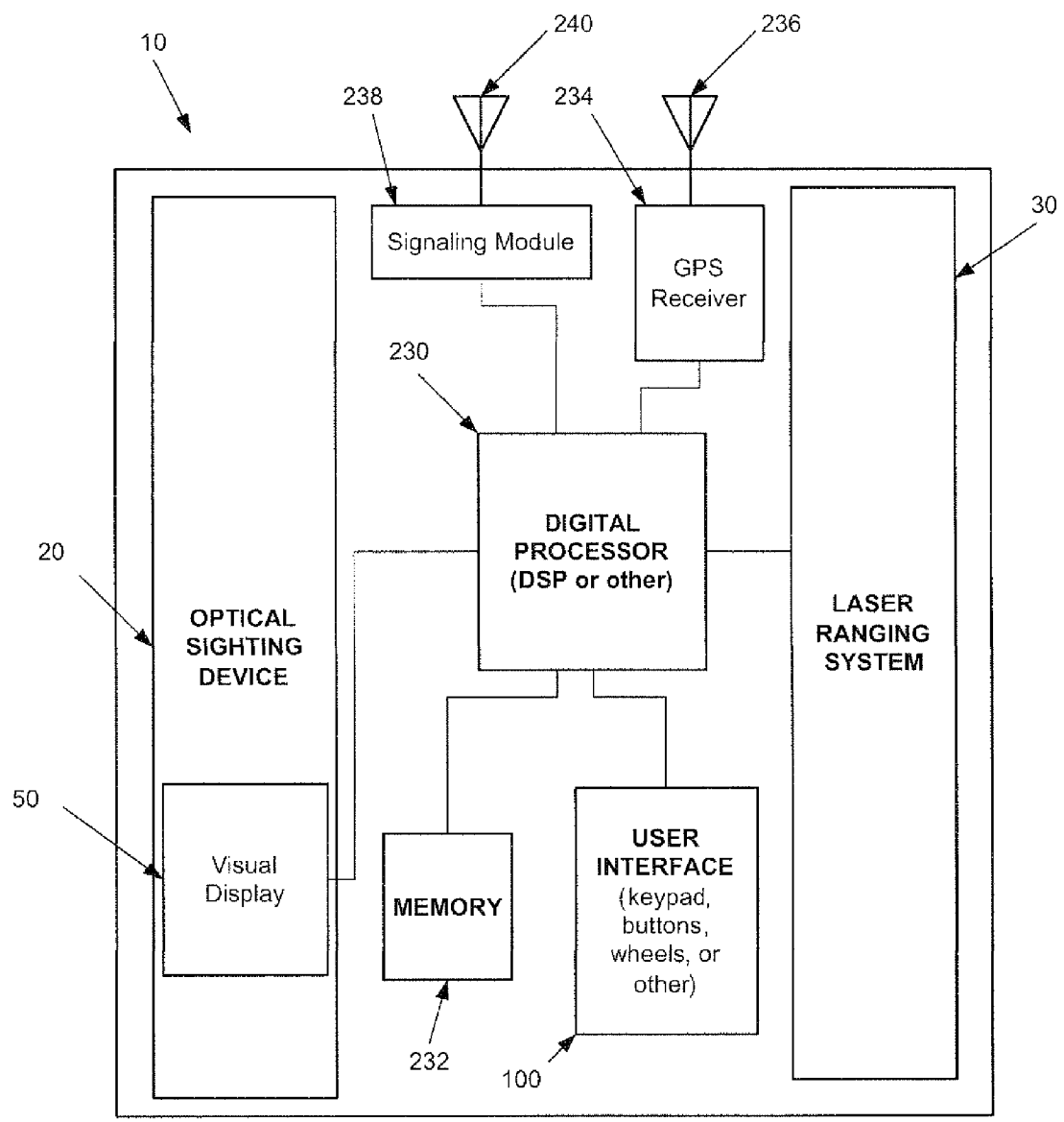
FIG. 12 is a schematic block diagram of the rangefinder of FIG. 1.

FIG. 12 is a block diagram illustrating components of rangefinder 10. With reference to FIG. 12, rangefinder 10 includes a computer processor or digital processor 230, such as a microprocessor or digital signal processor (DSP), operatively coupled to laser ranging system 30, visual display 50, and user interface 100. Aiming mark 40 and laser ranging system 30 are aligned relative to each other and supported in a common housing 90, which may include an internal carriage or frame. The altering of a gauge, indicia, or both, including the calculation and display of the gauge and/or indicia in field of view 52 described with reference to FIGS. 1, 2, 3, 4, 5, 6, 7, 8, 9A, 9B, 10A, 10B, 11A, 11B, 11C, and 11D may be performed by the digital processor 230 of rangefinder 10 automatically after a laser ranging measurement is made via the ranging system 30.

A memory 232 readable by digital processor 230 is preferably provided for storing a software program, gauge and indicia data, and user-defined settings, among other information. In some embodiments, memory 232 may also store data tables including MOA information for logarithmic measuring marks 140 (FIG. 6). A GPS receiver 234 and antenna 236 for acquiring geographic location data from GPS satellite signals may also be included in rangefinder 10 in operative association with digital processor 230. Finally a signaling module 238, which may include an antenna 240, may be coupled to digital processor 230 for transmitting signals representative of range, gauge data, and/or indicia data calculated and/or determined by digital processor 230 in combination with laser ranging system 30 to another device, such as a riflescope (FIG. 13).

While visual displays 50, 50', 50", 50'", and 50"" have been described as being viewed through eyepiece 22 of handheld laser rangefinder 10, visual displays 50, 50', 50", 50'", and 50"" may used with other optical sighting devices. For example, visual display 50 may be used with an optical targeting device, such as riflescope 250 of FIG. 13. Riflescope 250 may include one of the riflescopes sold by Leupold & Stevens, Inc., Beaverton, Oreg., USA under the trademarks LPS®, VX®, and others. As shown in FIG. 13, riflescope 250 may be mounted to rifle 252 and include a tubular housing 254 supporting an objective or objective lens assembly 256 and an eyepiece or eyepiece lens assembly 258 (sometimes referred to as an ocular or ocular lens assembly) at opposite ends. Objective 256 may be similar or identical to objective 21 and eyepiece 258 may be similar or identical to eyepiece 22. Accordingly, FIG. 2 could also represent a schematic diagram showing an arrangement of optical elements 260 of riflescope 250, together with ray trace lines 262 indicating the path of light from the distant object located to the left of the assembly of optical elements 260, as the light travels through the optical system along an optical path. Objective 256 focuses an image of the distant object at a first (front) focal plane 264 located medially of objective 256 and eyepiece 258. An erector lens assembly 268 interposed between objective 256 and eyepiece 258 inverts the image and refocuses it at a second (rear) focal plane 266 between erector lens assembly 268 and eyepiece 258. A preferred riflescope 250 may comprise, for example, a VARI-X® III brand riflescope sold by Leupold & Stevens, Inc., Beaverton, Oreg., USA, modified according to various embodiments to include visual displays 50, 50', 50", 50'", and 50"".

At least a part of erector lens assembly 268 may be movable in response to rotation of a power selector ring 270 (FIG. 13) or other power selector mechanism to adjust the optical power of riflescope 250 within a predetermined range of magnification. For example, the optical power of riflescope 250 may range between approximately 8.5× and 25× magnification, in accordance with one embodiment, or between approximately 6.5× and 20× magnification, in accordance with an alternative embodiment. Other embodiments may allow optical power adjustment within different ranges of adjustment, such as 4.5-14×, 3.5-10×, and 2.5-8×, for example, the optical zoom ratio in each instance being approximately 3:1. In yet other embodiments, the optical power of riflescope 250 may be fixed.

Visual displays 50, 50', 50", 50'", and 50"" may be located in the optical path between objective 256 and eyepiece 258 and more preferably between erector lens assembly 268 and eyepiece 258, at or adjacent rear focal plane 266. When one of visual displays 50, 50', 50", 50'", and 50"" is located at or adjacent rear focal plane 266, an apparent size of display elements 54 will not change as power selector ring 270 is rotated. Alternatively, visual displays 50, 50', 50", 50'", and 50"" may be located at or adjacent front focal plane 264 whereby the apparent size of display elements 54 will change as power selector ring 270 is rotated. In such a case, a rotary encoder (not shown) could be used to convert an angular position of power selector ring 270 into an encoder signal which may be a digital signal communicated to processor 230. The variable scale of FIGS. 3, 4, 6 or gauge and/or indicia of FIGS. 3, 4, 6, and 9A, 9B, 10A, 10B, 11A, 11B, 11C, and 11D could then be responsive to the output signal of laser ranging system 30 and the encoder signal to alter the gauge, indicia, or both as described with reference to FIGS. 1-11C. Other devices, such as a synchro, resolver, rotary variable differential transformer (RVDT), rotary potentiometer, or the like may be used in place of or in combination with the rotary encoder.

The output signal of laser ranging system 30 may be wirelessly transmitted from laser rangefinder 10 to riflescope 250. However, rangefinder 10 may include a cable connector plug or socket for establishing a wired connection to riflescope 250, or laser ranging system 30 may be supported in a common housing along with optical elements 260. In the case of a wired connection, a data bus may be provided using any protocol, such as Advanced Technology Attachment (ATA), Personal Computer Memory Card International Association (PCMCIA), Small Computer System Interface (SCSI), IEEE1394 (FireWire), Serial ATA, and/or Universal Serial Bus (USB), for example. The wireless connection may use low powered electromagnetic waves to transmit data using any wireless protocol, such as Bluetooth™, WiFi, IEEE 802.11, Infrared Data Association (IrDA), and/or Radio Frequency Identification (RFID), for example.

Visual displays 50, 50', 50", 50'", and 50"" described herein are not limited to use in rangefinders or riflescopes, but may also be used in various other types of sighting devices and projectile weapon aiming devices and may be used to aim one or more of a variety of projectile weapons, such as rifles, pistols, crossbows, artillery, and others. For example, rangefinder 10 could transmit range data, gauge data, indicia data or other data to riflescope 250 via signaling module 238 and antenna 240. In addition, ranging system 30 could be integrated with a riflescope, such as a laser rangefinder riflescope. Furthermore, a laser rangefinder with a high optical magnification power, such as a spotting scope with integral laser ranging system could be used and may even provide a more precise scale than a handheld laser rangefinder. In yet another embodiment, a combined optical tool could be used wherein an optical sighting device, such as a riflescope, may be adjusted based on a laser rangefinder acquired range. For example, marks or front focal plane range indicators or other settings on the optical sighting device may be altered to properly calibrate a feature of optical sighting device based on the measure range.

Image Capture and Measurement

Figure 14:
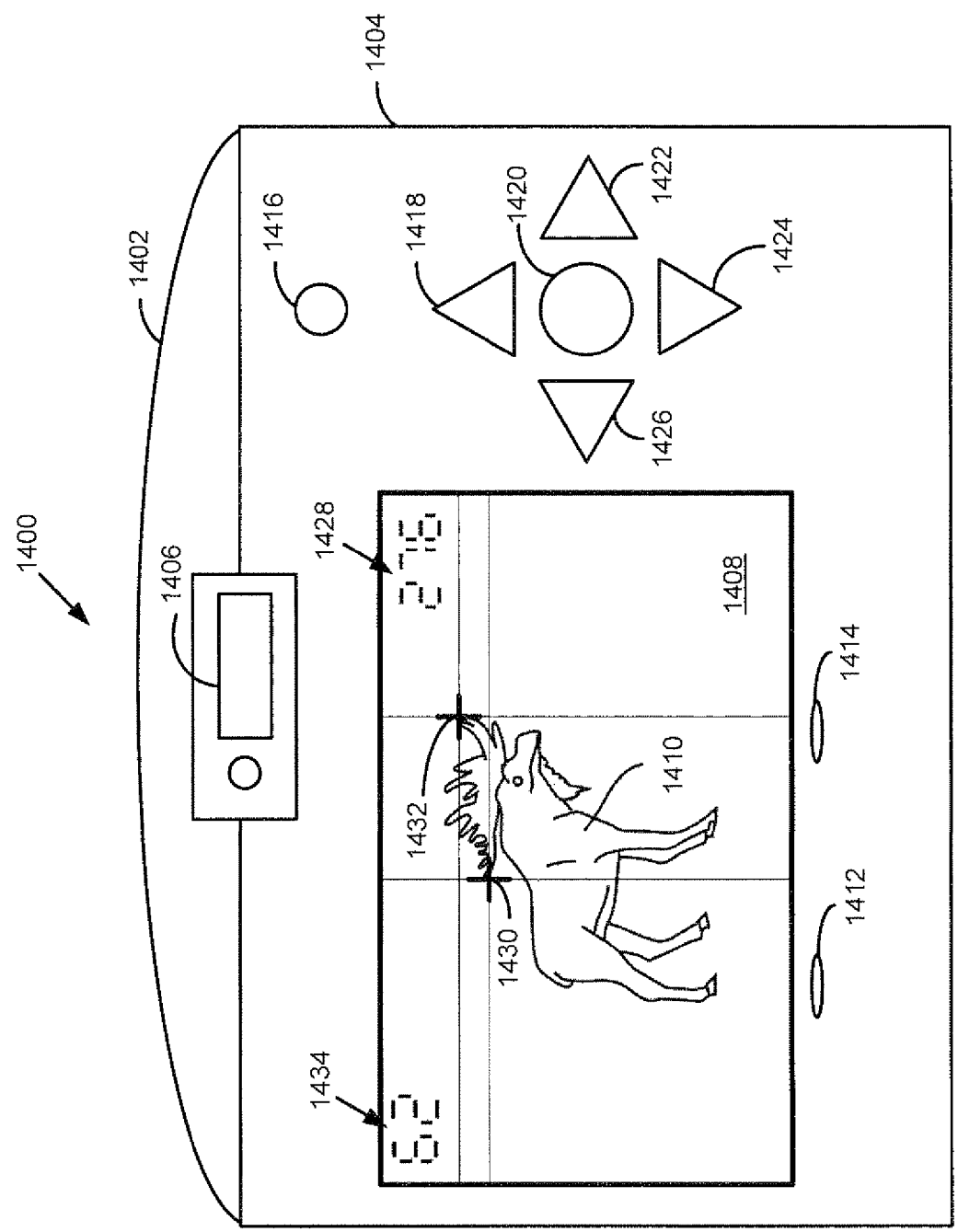
FIG. 14 is a rear elevation view of a digital camera.

The variable scales, gauges, and/or indicia discussed with reference to FIGS. 3, 4, 6, 7, and 9A, 9B, 10A, 10B, 11A, 11B, 11C, and 11D could also be used with a digital camera display, computer screen display or other suitable display. For example, the variable scales, gauges, and/or indicia may be used with a digital camera 1400 (e.g., a game camera, stationary game camera, or handheld digital camera) as shown in FIG. 14. The camera 1400 may include a body 1402 having a generally rectangular box shape and a grip 1404. A viewfinder 1406 may be optically coupled to a main lens such that a user can look through the viewfinder 1406 to lineup a shot.

Images may be captured via an image capture device (not shown), such as a charged coupled device (CCD) sensor or complimentary metal oxide semiconductor (CMOS), or other device capable of converting electromagnetic waves into digital data. The captured images may be stored in a memory (not shown) for later access.

A display device 1408 may be mounted in the body 1402. Stored images and camera settings may be viewed on the display device 1408. In addition, the display device 1408 may be configured to display and refresh images as viewed through the main lens in near real-time or real-time fashion. The display device 1408 may be any display device such as a transmissive or reflective liquid crystal display (LCD), organic light-emitting diode (OLED), cathode ray tube (CRT) display, or other suitable micro display. In addition, display device 1408 may have the ability to display and receive information (e.g., touchscreen).

A laser ranging system similar to those discussed with reference to FIGS. 1-12 may be incorporated into digital camera 1400 to measure a range to the object. In addition, the user may be able to key in the range to the target or the digital camera 1400 may receive the range from an external range finder via a wired or wireless connection. Further, the digital camera 1400 may communicate with other electronic devices, such as a personal computer to upload stored images. In the case of a wired connection, a data bus may be provided using any protocol, such as Advanced Technology Attachment (ATA), Personal Computer Memory Card International Association (PCMCIA), Small Computer System Interface (SCSI), IEEE1394 (FireWire), Serial ATA, and/or Universal Serial Bus (USB). The wireless connection may use low powered electromagnetic waves to transmit data using any wireless protocol, such as Bluetooth™, WiFi, IEEE 802.11, Infrared Data Association (IrDA), and/or Radio Frequency Identification (RFID).

Buttons 1412, 1414, 1416, 1418, 1420, 1422, 1424, and 1426 may be mounted in body 1402 adjacent to the display 1408. The buttons 1412-1426 may be used to signal various selections of options, commands, etc. based on the contents of display 1408. Use of the buttons 1412-1426 is described in further detail below. Of course, fewer or additional buttons may be used.

According to one embodiment, a method of measuring a size of a feature of a distance object on the display 1408 includes the following steps. First, the user turns on the digital camera 1400 and aims the digital camera 1400 at a target, such as moose 1410, until the target is visible in a field of view of viewfinder 1406 and/or display 1408. Upon depressing a switch (such as one of the buttons 1412-1426), an image of the object may be captured using an image capture device. Next a range is measured from the image capture device (or the digital camera 1400) to the object. For example, a laser ranging system similar to those discussed with reference to FIGS. 1-12 may measure the range after the user depresses range finding button 1416. The digital camera 1400 may display the range 1428 on display 1408. The range may be acquired simultaneously with the captured image or before or after the image is captured and a memory device may keep track of the range associated with the captured image. For example, the measured range may be linked with the stored captured image in memory.

After acquiring the image of the object and measuring the range to the object, the captured image may be displayed on display 1408. For example, the user may have taken a photo of moose 1410 (as shown in FIG. 14) and may desire to measure the length of the moose's antlers. The user may accomplish this by selecting two points on the displayed image corresponding to the size of the feature to be measured. For example, the user may enter a distance measuring mode by depressing a menu button, such as one of the buttons 1412 or 1414. This may activate and display cursors (e.g., crosshairs 1430 and 1432) on display 1408. The user may manipulate the location of the cursors using any of the directional arrows, 1418, 1422, 1424, and 1426. For example, the user may position crosshair 1430 on the far left feature of the moose's antler and select an enter button 1420. Next, the user may position the crosshair 1432 on the far right feature of the moose's antler and depress the enter button 1420. The relative location of the cursors need not be horizontal or vertical (e.g., the distance to be measure may be at an angle as shown in FIG. 14). After the two points have been selected, the size of the feature to be measured may be calculated based on the cursor locations relative to the image and the range data associated with the image according to any of the methods previously described. The calculated size 1434 may be displayed on display 1408. As shown in FIG. 14, the digital camera 1400 shows that the moose 1410 was approximately 276 yards away and the moose's antlers are approximately 62 inches in length (i.e., the distance between cursors 1430 and 1432 is approximately 62 inches at 276 yards).

According to one embodiment, a scale (e.g., one of the scales shown in FIGS. 3, 4, 6, 7, and 9A, 9B, 10A, 10B, 11A, 11B, 110, and 11D) is generated based on the acquired range and displayed at an edge of display device 1408 (or anywhere within the viewable area of display device 1408) for visual reference. In addition, the user may be able to select the scale and move (and rotate) it with respect to the displayed image to measure various objects. For example, the user may use one or more of the buttons 1412-1426 to select the scale and may use any of the directional arrows, 1418, 1422, 1424, and 1426 to move the scale with respect to the displayed image. By way of another example, the user may select and move the scale via a touchscreen. The user may be able to pre-selected scale parameters, such as displaying feet, inches, meters in a manner similar to that used on a yard stick.

According to another embodiment, the user may select a gauge to measure the size of the feature. For example, the user may select one of the gauges previously described with reference to FIGS. 3, 4, 6, 7, and 9A, 9B, 10A, 10B, 11A, 11B, 11C, and 11D. Positioning the first cursor may define a datum from which measurements can be made. For example, the user may position cursor 1430 at the left most side of the moose's antler thereby defining a datum. As previously described, the user may then align the second cursor 1432 with an extent of the feature to be measured (e.g., the right most side of the moose's antler). The gauge may be displayed on display 1408 and may resize as the user moves the second cursor 1432 relative to the displayed image. The calculated size 1434 may automatically update as the second cursor 1432 is being aligned. This feature may be particularly helpful when using a moose gauge (e.g., FIGS. 10A and 10B) and ram gauge (e.g., FIGS. 11A, 11B, 110, and 11D).

The image may be rotated before or after selecting the two points on the image to account for skew of the object. In addition, the user could select a plurality of points along a curve to calculate a dimension of the curve, such as an antler or a curved distance along terrain. Furthermore, multiple ranges could be determined and stored. This may allow the user to triangulate a length between points which are not parallel to a plane of the image. For example, a length could be calculated based on the multiple ranges at a start point and end point and a measured distance parallel to the image plane.

According to one embodiment, one or more captured images and/or measured ranges may be used to score an animal using any number of scoring systems, such as the Boone and Crockett scoring system or the Pope and Young scoring system. For example, if both a side and frontal view of a set of antlers is captured, the user may select points on the side view to establish a depth of the antlers and select points on the front view to establish a width of the antlers. In addition, the lengths and widths of an antler's main beams and tines may be measured to calculate the score. For example, a curve formula may be applied to selected points of a curving beam to obtain an approximate length of the beam. Further, if the scoring systems requires a measurement to start from the middle of a beam, a midpoint may automatically be generated based on an analysis of the image. For example, edge detection techniques may be used to detect the outline of the beam so that a midpoint of the beam may be determined. By way of another example, the user may define the outline of the beam by picking points on both sides of the beam so that a midpoint may be determined to use as a starting point in a measurement.

According to one embodiment, the user may be prompted to measure multiple dimensions using one or more captured images of a set of antlers based upon predetermined criteria to determine a final score (e.g., by using the official scoring system for North American big game trophies, developed by the Boone and Crocket Club® of Missoula, Mont.). For example, the user may be prompted to enter certain parameters, such a total number of normal and abnormal points on both the right and left antlers. In addition, the user may be prompted to determine a dimension of one or more features of the antlers using a captured image of the antlers. For example, from a front view, the user may select the left most point of the left antler and the right most point of the right antler to determine a total spread of the antlers. Likewise, the user may position a scale relative to the displayed left and right antlers to determine the total spread and enter the determined value. Further, edge detection techniques could be used to identify the left right antlers and determine the total spread. By way of another example, the circumference of the left and right beams may be determined from a front view by prompting the user to indicate the diameter of each beam (e.g., selecting points adjacent the skull) and then by calculating the circumference (e.g., multiplying the diameter by pi). A final score may be calculated using the determined parameter values based on a scoring system (e.g., adding, subtracting, multiplying, and/or dividing the parameters in a predetermined manner to yield a final score).

In addition, the captured image and measured range could be transferred from the digital camera 1400, for instance, on to another device, such as a computer, PDA, or cell phone. The image data of the object along with range data could be accessed by a program, such as software running on an image capture device or a personal computer. As a user sizes a variable scale, such as those shown in FIGS. 3, 4, 6, or a gauge, such as those shown in FIGS. 3, 4, 6, and 9A, 9B, 10A, 10B, 11A, 11B, 11C, and 11D, an algorithm may be used to update indicia associated with the scale or gauge based on the range data, optical zoom, and size of the scale/gauge relative to the overall size of the captured image. For example, the user could capture an image of a ram and drag a ram full curl gauge similar to that shown in FIGS. 11A, 11B, 11C, and 11D over the ram's horn. As the user stretches the gauge (e.g. resizes it), the associated indicia automatically update. When the gauge is properly aligned and sized to match the horn, the indicia may be read by the user to determine the desired dimension. This may not only allow a park ranger or conservationist to survey the maturity of a herd, but could allow a hunter to evidence a successful hunt without actually taking the animal. In addition, because animals tend not to hold still, capturing an image allows for easy measurement of antlers or horns and may allow for more accurate measurements.

The variable scales, gauges, and/or indicia discussed with reference to FIGS. 1-14 may be used with other electronic and optical devices that are used observe objects (e.g., remote objects) and to collect electromagnetic radiation, such as binoculars, spotting scopes, monoculars, telephoto lens, optical telescopes, other telescopes, etc. In addition, while the remote objects may include animals, trees, fish, etc., the remote objects may also include buildings, fences, rivers, roads, mountain ranges, etc.

The methods and systems for measuring a size of a feature of a distant object may be implemented in and/or by any suitable hardware, software, firmware, or combination thereof. Accordingly, as used herein a component or module can comprise hardware, software, and/or firmware components. For example, the methods and systems may exist as one or more software or firmware programs comprised of program instructions in source code, object code, executable code or other formats. A software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Embodiments may include various steps, which may be embodied in machine-executable instructions to be executed by a general-purpose or special-purpose processor (or other electronic device). Alternatively, the steps may be performed by hardware components that include specific logic for performing the steps or by a combination of hardware, software, and/or firmware. A result or output from any step, such as a confirmation that the step has or has not been completed or an output value from the step, may be stored, displayed, printed, and/or transmitted over a wired or wireless network. For example, the size of the feature of the object may be stored, displayed, or transmitted over a network.

Embodiment may also be provided as a computer program product including a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

The invention claimed is:

1. A system for measuring a size of a feature of a distant object, comprising:
a rangefinder operable to determine a range to the distant object and to generate an output signal indicative of the range;
an aiming mark to facilitate aiming the rangefinder at the distant object;
an optical sighting device including a visual display displayed in a field of view of the optical sighting device, the visual display comprising:
a variable scale having a gauge for measuring the feature of the distant object and an indicia associated with the gauge; and
the variable scale responsive to the output signal of the rangefinder to alter the gauge or the indicia, or both, so that the indicia represents a linear dimension at the determined range that is subtended by the gauge, whereby the size of the feature is estimable by a visual comparison between the gauge and the feature, with reference to the indicia.

2. The system of claim 1 further comprising an optical targeting device coupled to the rangefinder.

3. The system of claim 1 wherein the distant object is a game animal and the linear dimension subtended by the gauge is equal to or greater than a minimum legal size for the game animal.

4. The system of claim 1 wherein the visual display further comprises a data readout operable to indicate the determined range to the distant object.

5. The system of claim 1 further comprising a controller operable to alter the gauge or indicia, or both of the variable scale in response to the output signal of the rangefinder.

6. The system of claim 1 wherein:
the gauge comprises a plurality of spaced apart measuring marks and the spacing between at least two of the measuring marks is altered in response to the output signal of the rangefinder, and
the indicia comprises a numerical readout that is altered in response to the output signal of the rangefinder.

7. The system of claim 1 wherein the gauge comprises a geometric shape that is altered in response to the output signal of the rangefinder.

8. The system of claim 1:
further comprising a user input device for receiving a scale size input;
wherein the gauge comprises a plurality of logarithmically spaced apart measuring marks selectively displayed in the field of view of the optical sighting device;
wherein the variable scale is responsive to the scale size input and the output signal of the rangefinder to display a first one of the measuring marks, a second one of the measuring marks, and a third one of the measuring marks so that the linear dimension at the determined range that is subtended by a separation between the first displayed measuring mark and the second displayed measuring mark corresponds to the scale size input and the linear dimension at the determined range that is subtended by a separation between the first displayed measuring mark and the third displayed measuring mark is greater than the scale size input; and
wherein the variable scale is operable to display the indicia so that the indicia includes:
a first part representing the linear dimension at the determined range that is subtended by the separation between the first displayed measuring mark and the second displayed measuring mark in the field of view of the optical sighting device, and
a second part representing the linear dimension at the determined range that is subtended by the separation between the first displayed measuring mark and the third displayed measuring mark in the field of view of the optical sighting device.

9. A system for measuring a feature of a distant animal, comprising:
a rangefinder operable to determine a range to the animal and to generate a first output signal indicative of the range;
an aiming mark to facilitate aiming the rangefinder at the animal;
a user input device operable to receive a scale size input and to generate a second output signal indicative of the scale size;
an optical sighting device including a visual display displayed in a field of view of the optical sighting device, the visual display comprising:
a geometrically shaped gauge having at least two points for measuring the feature of the animal; and
the visual display responsive to the first output signal of the rangefinder and the second output signal of the input device to alter the gauge so that the at least two points of the gauge have a separation subtending a linear dimension at the determined range corresponding to the scale size input, whereby the size of the feature is estimable by a visual comparison between the gauge and the feature.

10. The system of claim 9 wherein the distant animal is a game animal and the linear dimension subtended by the at least two separated points of the gauge is equal to or greater than a minimum legal size for the game animal.

11. The system of claim 9 wherein the visual display further comprises a data readout operable to indicate the determined range to the distant animal.

12. The system of claim 9 further comprising a controller operable to alter the visual display in response to the first output signal of the rangefinder and the second output signal of the input device.

13. The system of claim 9:
wherein the visual display comprises a plurality of spaced apart geometrically shaped gauges selectively displayed in the field of view of the optical sighting device;
wherein the visual display is responsive to the first output signal of the rangefinder and the second output signal of the input device to display a first one of the geometrically shaped gauges so that the at least two points of the first displayed geometrically shaped gauges have a separation subtending a linear dimension at the determined range corresponding to the scale size input.

14. The system of claim 9 wherein the visual display is operable to display an indicia so that the indicia includes:
a first part representing a linear dimension at the determined range that is subtended by a separation between a first one of the measuring points and a second one of the measuring points in the field of view of the optical sighting device, and
a second part representing a linear dimension at the determined range that is subtended by a separation between a third one of the measuring points and a fourth one of the measuring points in the field of view of the optical sighting device.

15. A method of measuring a size of a feature of a distant object in a field of view of an optical sighting device, comprising:
aiming the optical sighting device at the object until the object is visible in the field of view of the optical sighting device;
measuring a range from the optical sighting device to the object and generating a measured range signal representing the range;
displaying a visual display in the field of view, the visual display including a gauge and associated numerical indicia;
automatically altering the visual display in response to the measured range signal so that the numerical indicia represents a linear dimension at the measured range that is subtended by the gauge;
aligning the gauge with the feature of the object in the field of view; and
reading the gauge and the indicia to determine the size of the feature of the object.

16. The method of claim 15 wherein the distant object is a game animal and the linear dimension subtended by the gauge is equal to or greater than a minimum legal size for the game animal.

17. The method of claim 15 wherein the visual display further includes a data readout operable to indicate the determined range to the distant object.

18. The method of claim 15 wherein a controller automatically alters the visual display in response to the measured range signal of the rangefinder.

19. The method of claim 15 wherein:
the gauge comprises a plurality of spaced apart measuring marks and the spacing between at least two of the measuring marks is altered in response to the measured range signal of the rangefinder, and
the numerical indicia comprises a plurality of numerical readouts that are altered in response to the measured range signal of the rangefinder.

20. The method of claim 15 wherein the gauge comprises a geometric shape that is altered in response to the measured range signal of the rangefinder.

21. The method of claim 15 further comprising receiving a scale size input and wherein:
the gauge comprises a plurality of logarithmically spaced apart measuring marks selectively displayed in the field of view; and
the step of automatically altering the visual display comprises:
determining a position of a first measuring mark based upon the scale size input, the measured range signal, and a separation between the first measuring mark and a reference point;
determining a position of a second measuring mark relative to the first measuring mark based upon the separation between the first measuring mark and the reference point, the scale size input, and a separation between the second measuring mark and the reference point so that a linear dimension at the measured range that is subtended by a separation between the first measuring mark and the second measuring mark is substantially equal to the scale size input;
determining a position of a third measuring mark relative to the first measuring mark and the second measuring mark based upon the separation between the first measuring mark and the reference point so that a linear dimension at the measured range that is subtended by a separation between the second measuring mark and third measuring mark is greater than the scale size input;
displaying the first measuring mark, the second measuring mark, and the third measuring mark; and
displaying the numerical indicia so that the numerical indicia represent the linear dimension at the measured range that is subtended by a separation between the first measuring mark and the second measuring mark and the linear dimension at the measured range that is subtended by a separation between the second measuring mark and third measuring mark.

22. A reticle for an optical sighting device, comprising:

an aiming mark to facilitate aiming the optical sighting device at a distant object when the reticle is positioned in a field of view of the optical sighting device;

a first data readout operable to indicate a range to the distant object as determined by a rangefinder when the reticle is positioned in the field of view of the optical sighting device;

a variable scale having a gauge for measuring a size of a feature of the distant object and an indicia associated with the gauge, the gauge comprising a series of logarithmically spaced apart measuring marks selectively displayed in the field of view of the optical sighting device;

the variable scale responsive to the range determined by the rangefinder and a scale size input to:

display a first one of the measuring marks, a second one of the measuring marks, and a third one of the measuring marks so that a linear dimension at the determined range that is subtended by a separation between the first displayed measuring mark and the second displayed measuring mark corresponds to the scale size input and a linear dimension at the determined range that is subtended by a separation between the first displayed measuring mark and the third displayed measuring mark is greater than the scale size input, and display the indicia so that the indicia represent the linear dimension at the determined range that is subtended by the separation between the first displayed measuring mark and the second displayed measuring mark and the linear dimension at the determined range that is subtended by the separation between the first displayed measuring mark and the third displayed measuring mark; and the variable scale positioned relative to the aiming mark to facilitate measuring the size of the feature by a visual comparison between the gauge and the feature, with respect to the indicia.

23. The reticle of claim 22 wherein the variable scale is responsive to a controller operable to display the first one of the measuring marks, the second one of the measuring marks, the third one of the measuring marks, and indicia in response to the determined range and scale size input.

24. A method of measuring a size of a feature of a distant object on a display, the method comprising:

capturing an image of the object using an image capture device;

measuring a range from the image capture device to the object;

associating the measured range with the captured image;

displaying the captured image on the display;

selecting two points on the displayed image corresponding to the size of the feature to be measured;

calculating the size of the feature based on the two selected points and the associated measured range; and displaying the calculated size on the display.

25. The method of claim 24 further comprising:

selecting a gauge to measure the size of the feature and wherein the step of selecting the two points includes selecting a datum from which measurements can be made and aligning a second of the two points with an extent of the feature to be measured; and displaying the gauge on the display such that the gauge resizes and the calculated size automatically updates while the second point is being aligned.

* * * * *

UNITED STATES PATENT AND TRADEMARK OFFICE
CERTIFICATE OF CORRECTION

PATENT NO. : 7,738,082 B2  Page 1 of 2
APPLICATION NO. : 11/876559
DATED : June 15, 2010
INVENTOR(S) : Victoria J. Peters It is certified that error appears in the above-identified patent and that said Letters Patent is hereby corrected as shown below:

Column 11
Line 25, change "50'" to --50'"--.

Column 11
Line 50, change "50'" to --50'"--.

Column 11
Line 52, change 50'" to --50'"--.

Column 13
Line 11, change "maybe" to --may be--.

Column 16
Line 53, change "measure" to --measured--.

Column 16
Line 66, change "110" to --11C--.

Column 17
Line 9, change "pre-selected" to --pre-select--.

Column 17
Line 28, change "110" to --11C--.

Column 17
Line 51, change "systems requires" to --system requires--.

Column 18
Line 10, change "left right" to --left and right--.

Column 18
Line 46, before "observe" insert --to--.

Signed and Sealed this

Fourteenth Day of December, 2010

David J. Kappos
*Director of the United States Patent and Trademark Office*

Column 19
Line 32, change "Embodiment" to --Embodiments--.